United States Patent
Song et al.

(10) Patent No.: US 12,062,158 B2
(45) Date of Patent: Aug. 13, 2024

(54) IMAGE DENOISING METHOD AND APPARATUS

(71) Applicant: HUAWEI TECHNOLOGIES CO., LTD., Guangdong (CN)

(72) Inventors: Fenglong Song, Shanghai (CN); Liu Liu, Shanghai (CN); Tao Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 393 days.

(21) Appl. No.: 17/462,176

(22) Filed: Aug. 31, 2021

(65) Prior Publication Data

US 2021/0398252 A1 Dec. 23, 2021

Related U.S. Application Data

(63) Continuation of application No. PCT/CN2020/076928, filed on Feb. 27, 2020.

(30) Foreign Application Priority Data

Mar. 1, 2019 (CN) .......................... 201910156951.0

(51) Int. Cl.
*G06T 5/70* (2024.01)
*G06N 3/045* (2023.01)
*G06T 5/50* (2006.01)

(52) U.S. Cl.
CPC .............. *G06T 5/70* (2024.01); *G06N 3/045* (2023.01); *G06T 5/50* (2013.01)

(58) Field of Classification Search
CPC . G06T 5/002; G06T 5/50; G06T 2207/10016; G06T 2207/20016;
(Continued)

(56) References Cited

U.S. PATENT DOCUMENTS

2008/0253678 A1* 10/2008 Li .............................. G06T 5/50
382/270
2011/0211765 A1 9/2011 Nagumo et al.
(Continued)

FOREIGN PATENT DOCUMENTS

| CN | 102203826 A | 9/2011 |
| CN | 105335947 A | 2/2016 |

(Continued)

OTHER PUBLICATIONS

Kunz D et al:"Nonlinear multiresolutiongradient adaptive filter for medicalimages" Proceedings of SPIE, IEEE,US vol. 5032 2003, pp. 732 742 XP002421756 DOI:10 .1117/12 .481323ISBN:978 1 62841 730-2*abstract, sections 1-5, Figs .1-13*.

(Continued)

*Primary Examiner* — Jianxun Yang
(74) *Attorney, Agent, or Firm* — HUAWEI TECHNOLOGIES CO., LTD.

(57) ABSTRACT

This application provides an image denoising method and apparatus, and relates to the artificial intelligence field and specifically relates to the computer vision field. The method includes: performing resolution reduction processing on a to-be-processed image to obtain a plurality of images whose resolutions are lower than that of the to-be-processed image; extracting an image feature of a higher-resolution image based on an image feature of a lower-resolution image to obtain an image feature of the to-be-processed image; and performing denoising processing on the to-be-processed image based on the image feature of the to-be-processed image to obtain a denoised image. This application can improve an image denoising effect.

12 Claims, 9 Drawing Sheets

(58) Field of Classification Search
CPC ........... G06T 2207/20081; G06T 2207/20084; G06N 3/045; G06N 3/044; G06N 3/063; G06N 3/084
See application file for complete search history.

(56) References Cited

U.S. PATENT DOCUMENTS

| | | | | |
|---|---|---|---|---|
| 2019/0049540 | A1* | 2/2019 | Odry | G01R 33/543 |
| 2020/0184252 | A1* | 6/2020 | Syeda-Mahmood | G06V 10/26 |

FOREIGN PATENT DOCUMENTS

| | | | |
|---|---|---|---|
| CN | 106447616 | A | 2/2017 |
| CN | 107578377 | A | 1/2018 |
| CN | 108416748 | A | 8/2018 |
| CN | 108492258 | A | 9/2018 |
| CN | 108604369 | A | 9/2018 |
| CN | 108805840 | A | 11/2018 |
| CN | 109993707 | A | 7/2019 |
| EP | 3923233 | A1 | 12/2021 |

OTHER PUBLICATIONS

Jeon Wonseok et al:Speckle noisereduction for digital holographic imagesusing multi-scale convolutional neuralnetworks Optics Letters, vol. 43 No .17 Aug. 28, 2018 (Aug. 28, 2018) p. 4240,XP055897221 USISSN:0146 9592 DOI: 10 .1364/0L. 43 .004240*abstract, Figs. 1-4, equations (1) (9)*.

Tian Chunwei et al: "Deep learning onimage denoising:An overview" Neural Networks Elsevier Sciencepublishers Barking, GB,vol. 131, Aug. 6, 2020 (Aug. 6, 2020) pp. 251-275 XP086281962 ISSN:0893 6080 DOI:10 .1016/J.NEUNET.2020.07.025[retrieved on 2020 OS 06]*the whole document*.

GU SfiUHANG et al.: "Self-Guided Networkfor Fast Image Denoising" 2019 IEEE/CVF International Conference Oncomputer Vision (ICCV) IEEE,Oct. 27, 2019 (Oct. 27, 2019) pp. 2511-2520 XP033723947 DOI:10 .1109/ICCV.2019.00260[retrieved on Feb. 29, 2020].

Samuel W. Hasinoff et al., "Burst photography for high dynamic range and low-light imaging on mobile cameras", Burst photography for high dynamic range and low-light imaging on mobile cameras, total:12pages.

A. Buades et al.,"A non-local algorithm for image denoising",Jul. 25, 2005, total:6pages.

Matteo Maggioni et al., "Video denoising, deblocking, and enhancement through separable 4-d nonlocal spatiotemporal transforms ", IEEE Transactions on Image Processing, vol. 21, No. 9, Sep. 2012, total:15pages.

Ying Tai, et al.,"MemNet: A Persistent Memory Network for Image Restoration",2017,total:9pages.

Christian J. Schuler et al.,"A Machine Learning Approach for Non-blind Image Deconvolution", Proceedings of the IEEE Conference on Computer Vision and Pattern Recognition (CVPR), 2013, pp. 1067-1074, total:8pages.

Kai Zhang et al.,"Beyond a Gaussian Denoiser: Residual Learning of Deep CNN for Image Denoising", Feb. 1, 2017,total:14pages.

Xiaojiao Mao et al., "Image Restoration Using Very Deep Convolutional Encoder-Decoder Networks with Symmetric Skip Connections",30th Conference on Neural Information Processing Systems (NIPS 2016), Barcelona, Spain. total:9pages.

Shuhang Gu et al.,"Learning dynamic guidance for depth image enhancement. In Computer Vision (ICCV) ", Proceedings of the IEEE Conference on Computer Vision and Pattern Recognition (CVPR), 2017, pp. 3769-3778, total:10pages.

Tak-Wai Hui et al.,"Depth Map Super-Resolution by Deep Multi-Scale Guidance", Computer Vision ECCV 2016 pp. 353-369,total:17pages.

Mjun Li et al.,"Deep Joint Image Filtering", Computer Vision ECCV 2016 pp. 154-169,total: 16pages.

Xintao Wang et al.,"Recovering Realistic Texture in Image Super-resolution by Deep Spatial Feature Transform", Proceedings of the IEEE Conference on Computer Vision and Pattern Recognition (CVPR), 2018, pp. 606-615, total:10pages.

Xiaoming Li et al.,"Learning Warped Guidance for Blind Face Restoration",Proceedings of the European Conference on Computer Vision (ECCV), 2018, pp. 272-289,total:18pages.

Qifeng Chen et al.,"Fast Image Processing With Fully-Convolutional Networks", Proceedings of the IEEE International Conference on Computer Vision (ICCV), 2017, pp. 2497-2506, total:12pages.

Olaf Ronneberger et al.,"U-Net: Convolutional Networks for Biomedical Image Segmentation",Medical Image Computing and Computer-Assisted Intervention MICCAI 2015 pp. 234-241,total:8pages.

Hengshuang Zhao et al.,"ICNet for Real-Time Semantic Segmentation on High-Resolution Images", Proceedings of the European Conference on Computer Vision (ECCV), 2018, pp. 405-420,total:16pages.

Wang Lu et al, Partition-Based Global Deblurring of Space-Variant Shake-Blurred Image, 2012 ,9 pages.

* cited by examiner

IMAGE DENOISING METHOD AND APPARATUS

CROSS-REFERENCE TO RELATED APPLICATIONS

This application is a continuation of International Application No. PCT/CN2020/076928, filed on Feb. 27, 2020, which claims priority to Chinese Patent Application No. 201910156951.0, filed on Mar. 1, 2019. The disclosures of the aforementioned applications are hereby incorporated by reference in their entireties.

TECHNICAL FIELD

This application relates to the computer vision field, and more specifically, to an image denoising method and apparatus.

BACKGROUND

Computer vision is an indispensable part of various intelligent/autonomous systems in diversified application fields, such as manufacturing, inspection, document analysis, medical diagnosis, and military affairs. Computer vision is a branch of knowledge about applying a camera/video camera and a computer to obtain required data and information about a photographed object. Figuratively speaking, eyes (a camera/video camera) and a brain (an algorithm) are installed for a computer, to replace human eyes for target recognition, tracking, measurement, and the like, so that the computer can sense an environment. Sensing may be considered as extraction of information from a sensory signal, and therefore computer vision may be considered as a science of research on how an artificial system "senses" an image or multi-dimensional data. In general, computer vision means using various imaging systems in place of an organ of vision to obtain input information, and using a computer in place of a brain to process and interpret the input information. An ultimate research objective of computer vision is to enable a computer to observe and understand the world through vision in a same way as humans do and to have a capability of autonomously adapting to an environment.

In the computer vision field, an imaging device usually needs to be used to obtain a digital image and recognize or analyze the digital image. In digitalization and transmission processes of the digital image, the digital image is usually interfered with by noise of an imaging device and noise of an external environment, resulting in a noise-corrupted image or a noise image. A noise-corrupted image affects an image displaying effect and image analysis and recognition. Therefore, how to better denoise an image is an issue to be resolved.

SUMMARY

This application provides an image denoising method and apparatus, to improve an image denoising effect.

According to a first aspect, an image denoising method is provided. The method includes: obtaining K images based on a to-be-processed image; obtaining an image feature of the to-be-processed image based on the K images; and performing denoising processing on the to-be-processed image based on the image feature of the to-be-processed image to obtain a denoised image.

The K images are images obtained by reducing a resolution of the to-be-processed image, and K is a positive integer.

The K images include a first image to a $K^{th}$ image, and the to-be-processed image is a $(K+1)^{th}$ image. The first image to the $(K+1)^{th}$ image include an $i^{th}$ image and an $(i+1)^{th}$ image, an image feature of the $(i+1)^{th}$ image is extracted based on an image feature of the $i^{th}$ image, a resolution of the $(i+1)^{th}$ image is higher than that of the $i^{th}$ image, and i is a positive integer less than or equal to K.

It should be understood that image resolutions of the first image to the $(K+1)^{th}$ image are in ascending order, where a resolution of the first image is the lowest and a resolution of the $(K+1)^{th}$ image is the highest.

In addition, the obtaining an image feature of the to-be-processed image based on the K images may be extracting a high-resolution image feature based on a low-resolution image feature, and finally obtaining the image feature of the to-be-processed image (the resolution of the to-be-processed image is a highest resolution among the (K+1) images).

Optionally, the obtaining an image feature of the to-be-processed image based on the K images includes: step 1: obtaining the image feature of the $i^{th}$ image; step 2: extracting the image feature of the $(i+1)^{th}$ image based on the image feature of the $i^{th}$ image; and repeat step 1 and step 2 to obtain the image feature of the $(K+1)^{th}$ image.

It should be understood that in the foregoing process, for the first image, an image feature of the first image may be obtained directly by performing convolution processing on the first image; and for each of a second image to the $(K+1)^{th}$ image, an image feature of the image may be extracted based on an image feature of a previous image.

In this application, an image feature of a low-resolution image is used to provide guidance on extraction of an image feature of a high-resolution image, and therefore global information of the to-be-processed image can be sensed as much as possible in a process of extracting the image feature of the high-resolution image. In this way, the extracted image feature of the high-resolution image is more accurate, so that a better denoising effect is achieved during image denoising performed based on the image feature of the to-be-processed image.

With reference to the first aspect, in some implementations of the first aspect, that an image feature of an $(i+1)^{th}$ image is extracted based on an image feature of an $i^{th}$ image includes: performing convolution processing on the $(i+1)^{th}$ image by using a first convolutional layer to an $n^{th}$ convolutional layer in N convolutional layers, to obtain an initial image feature of the $(i+1)^{th}$ image; fusing the initial image feature of the $(i+1)^{th}$ image with the image feature of the $i^{th}$ image to obtain a fused image feature; and performing convolution processing on the fused image feature by using an $(n+1)^{th}$ convolutional layer to an $N^{th}$ convolutional layer in the N convolutional layers, to obtain the image feature of the $(i+1)^{th}$ image.

Both n and N are positive integers, n is less than or equal to N, and N is a total quantity of convolutional layers used when the image feature of the $(i+1)^{th}$ image is extracted.

The smaller a value of n is, the sooner the initial image feature of the $(i+1)^{th}$ image can be obtained and the sooner the initial image feature of the $(i+1)^{th}$ image can be fused with the image feature of the $i^{th}$ image, so that the finally obtained image feature of the $(i+1)^{th}$ image is more accurate.

Optionally, n is equal to 1.

When n is equal to 1, after convolution processing is performed on the $(i+1)^{th}$ image for one time (the initial image feature of the $(i+1)^{th}$ image is obtained after convolution processing is performed for one time), the obtained initial image feature of the $(i+1)^{th}$ image may be fused with the image feature of the $i^{th}$ image, so that the finally obtained image feature of the $(i+1)^{th}$ image is more accurate.

With reference to the first aspect, in some implementations of the first aspect, the obtaining K images based on a to-be-processed image includes: performing downsampling operations on the to-be-processed image for K times, to obtain the first image to the $K^{th}$ image.

By performing the downsampling operations, the resolution of the to-be-processed image can be reduced, and image information included in the first image to the $K^{th}$ image can be reduced. This can reduce an amount of computation during feature extraction.

With reference to the first aspect, in some implementations of the first aspect, shuffle operations are performed on the to-be-processed image for K times, to obtain the first image to the $K^{th}$ image whose resolutions and channel quantities are different from those of the to-be-processed image.

The shuffle operations herein are equivalent to adjustments of the resolution and the channel quantity of the to-be-processed image, so as to obtain images whose resolutions and channel quantities are different from those of the original to-be-processed image.

A resolution and a channel quantity of any image in the first image to the $K^{th}$ image are different from those of the to-be-processed image. The resolution of the $i^{th}$ image in the K images obtained by performing the shuffle operations is lower than that of the to-be-processed image, and a channel quantity of the $i^{th}$ image is determined based on the channel quantity of the to-be-processed image, the resolution of the $i^{th}$ image, and the resolution of the to-be-processed image.

Specifically, the channel quantity of the $i^{th}$ image may be determined based on the channel quantity of the to-be-processed image and a ratio of the resolution of the $i^{th}$ image to the resolution of the to-be-processed image. Alternatively, the channel quantity of the $i^{th}$ image may be determined based on the channel quantity of the to-be-processed image and a ratio of the resolution of the to-be-processed image to the resolution of the $i^{th}$ image.

It should be understood that in this application, a ratio of A to B refers to a value of A/B. Therefore, the ratio of the resolution of the $i^{th}$ image to the resolution of the to-be-processed image is a value obtained by dividing a value of the resolution of the $i^{th}$ image by a value of the resolution of the to-be-processed image.

The first image to the $K^{th}$ image are obtained by performing the shuffle operations, and the image information can be retained when a low-resolution image is obtained based on the to-be-processed image, so that a relatively accurate image feature can be extracted during feature extraction.

It should be understood that the resolutions of the first image to the $K^{th}$ image may be preset.

For example, the resolution of the to-be-processed image is M×N, and two images with relatively low resolutions need to be obtained by performing shuffle operations. In this case, the resolutions of the two images may be M/2×N/2 and M/4×N/4.

With reference to the first aspect, in some implementations of the first aspect, a ratio of the channel quantity of the $i^{th}$ image to the channel quantity of the to-be-processed image is less than or equal to the ratio of the resolution of the $i^{th}$ image to the resolution of the to-be-processed image.

It is assumed that the channel quantity of the $i^{th}$ image is $C_i$, the channel quantity of the to-be-processed image is C, the resolution of the $i^{th}$ image is $M_i \times N_i$, and the resolution of the to-be-processed image is M×N. In this case, the ratio of the channel quantity of the $i^{th}$ image to the channel quantity of the to-be-processed image is $C_i/C$, and the ratio of the resolution of the $i^{th}$ image to the resolution of the to-be-processed image is $(M_i \times N_i)/(M \times N)$.

When the ratio of the channel quantity of the $i^{th}$ image to the channel quantity of the to-be-processed image is equal to the ratio of the resolution of the $i^{th}$ image to the resolution of the to-be-processed image, image content can remain unchanged during obtaining of the $i^{th}$ image based on the to-be-processed image, so that the extracted image feature of the $i^{th}$ image is more accurate (in comparison with a case in which image content is lost, the image feature extracted in this manner is more accurate).

It should be understood that when the image feature of the to-be-processed image is obtained based on the K images, the image features of the first image to the $(K+1)^{th}$ image need to be obtained.

Optionally, the obtaining the image features of the first image to the $(K+1)^{th}$ image includes: obtaining the image features of the first image to the $(K+1)^{th}$ image by using a neural network.

The neural network may be a convolutional neural network, a deep convolutional neural network, or a recurrent neural network.

Optionally, the neural network includes a top sub-network, a middle sub-network, and a bottom sub-network.

Optionally, the obtaining the image features of the first image to the $(K+1)^{th}$ image by using a neural network includes: obtaining the image feature of the first image by using the top sub-network; obtaining the image features of the second image to the $K^{th}$ image by using the middle sub-network; and obtaining the image feature of the $(K+1)^{th}$ image by using the bottom sub-network.

The top sub-network is used to process a lowest-resolution image, the middle sub-network is used to process a medium-resolution image, and the bottom sub-network is used to process a highest-resolution image. There are (K−1) middle sub-networks, and the (K−1) middle sub-networks are used to process the second image to the $K^{th}$ image. Each middle sub-network is used to process a corresponding image to obtain an image feature of the image.

With reference to the first aspect, in some implementations of the first aspect, the performing denoising processing on the to-be-processed image based on the image feature of the to-be-processed image to obtain a denoised image includes: performing convolution processing on the image feature of the to-be-processed image to obtain a residual estimated value of the to-be-processed image; and superimposing the residual estimated value of the to-be-processed image on the to-be-processed image to obtain the denoised image.

According to a second aspect, an image denoising apparatus is provided. The apparatus includes modules configured to perform the method in the first aspect.

According to a third aspect, an image denoising apparatus is provided. The apparatus includes: a memory, configured to store a program; and a processor, configured to execute the program stored in the memory, where when the program stored in the memory is being executed, the processor is configured to perform the method in the first aspect.

According to a fourth aspect, a computer-readable medium is provided. The computer-readable medium stores program code to be executed by a device, and the program code is used for performing the method in the first aspect.

According to a fifth aspect, a computer program product including an instruction is provided. When the computer program product runs on a computer, the computer is enabled to perform the method in the first aspect.

According to a sixth aspect, a chip is provided. The chip includes a processor and a data interface, and the processor reads, through the data interface, an instruction stored in a memory, to perform the method in the first aspect.

Optionally, in an implementation, the chip may further include a memory. The memory stores an instruction. The processor is configured to execute the instruction stored in the memory, where when the instruction is being executed, the processor is configured to perform the method in the first aspect.

According to a seventh aspect, an electronic device is provided. The electronic device includes an action recognition apparatus in any one of the first aspect to the fourth aspect.

DESCRIPTION OF EMBODIMENTS

Figure 1:
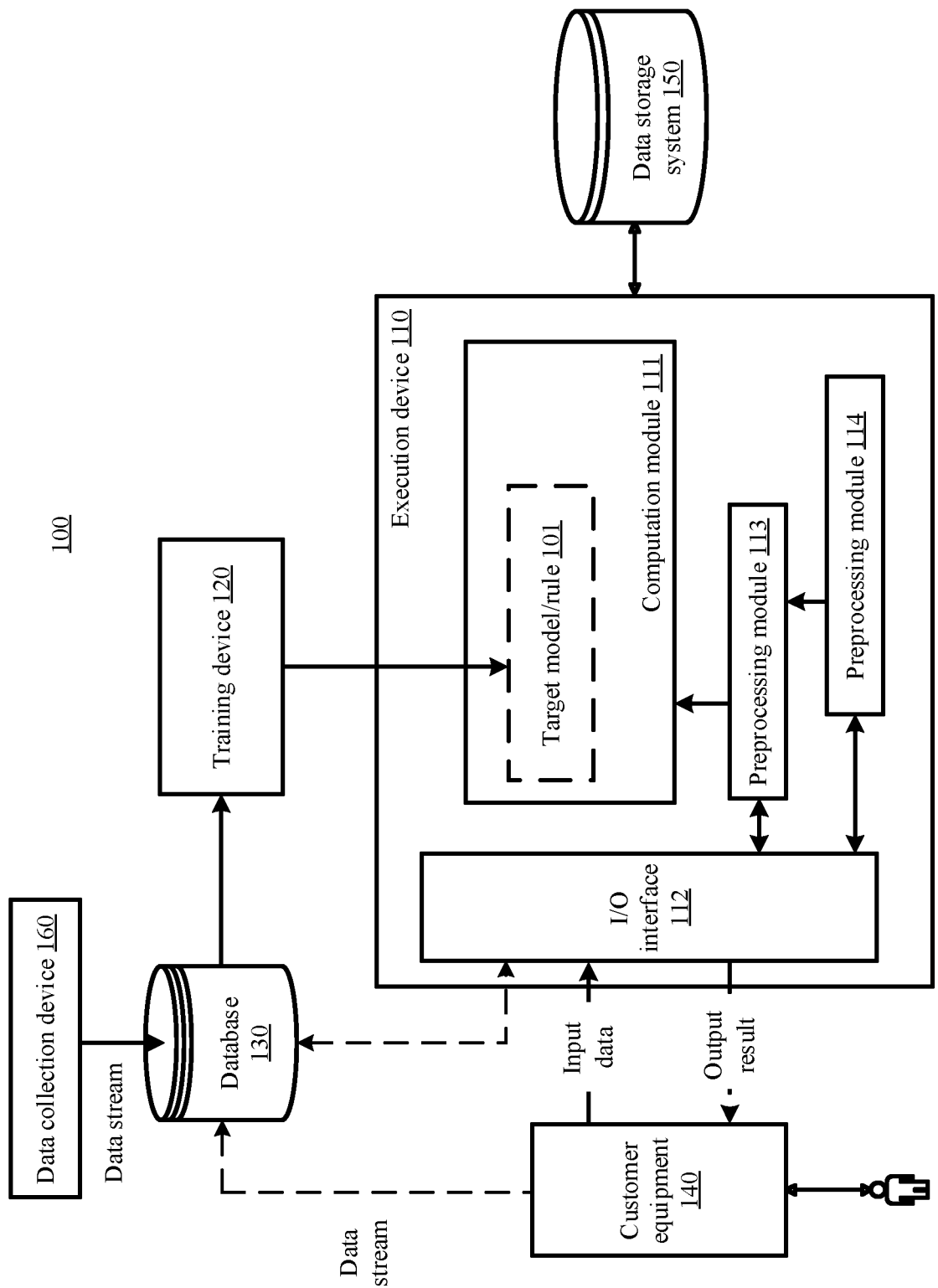
FIG. 1 is a schematic structural diagram of a system architecture according to an embodiment of this application.

The following describes technical solutions of this application with reference to accompanying drawings.

An image denoising method provided in the embodiments of this application can be applied to photographing, video recording, smart city, self-driving, human-computer interaction, and scenarios in which image processing, image displaying, and low-layer or high-layer image visual processing need to be performed, such as image recognition, image classification, semantic segmentation, video semantic analysis, and video action recognition.

Specifically, the image denoising method in the embodiments of this application can be applied to a photographing scenario and a scenario of image and video-based visual computing. The following separately describes the photographing scenario and the image recognition scenario briefly.

Photographing Scenario:

When a camera, a terminal device, or another intelligent electronic device is used for photographing, to display an image of better quality, the image denoising method in the embodiments of this application may be used during the photographing or after the photographing, to denoise a photographed image. By using the image denoising method in the embodiments of this application, image quality can be improved, thereby improving an image displaying effect and improving accuracy of an image-based vision algorithm.

Image Recognition Scenario:

As an application scope of an artificial intelligence technology is becoming wider, in many cases, image content needs to be recognized. During image recognition, image noise affects an image recognition effect to some extent. By using the denoising method in the embodiments of this application to perform image denoising processing during image recognition or before commencement of image recognition, image quality can be improved, thereby improving a subsequent image recognition effect.

A large quantity of neural network applications are included in the embodiments of this application. Therefore, for ease of understanding, the following first describes possible related terms and related concepts such as a neural network in the embodiments of this application.

(1) Neural Network

A neural network may include neurons. The neuron may be an arithmetic unit with $x_s$ and an intercept 1 as inputs. An output of the arithmetic unit may be:

$$h_{W,b}(x)=f(W^T x)=f(\Sigma_{s=1}^n W_s x_s + b) \quad (1\text{-}1)$$

$s=1, 2, \ldots n$, n is a natural number greater than 1, $W_s$ is a weight of $x_s$, and b is a bias of a neuron. f is an activation function of the neuron, and is used to introduce a nonlinear characteristic into the neural network to transform an input signal in the neuron into an output signal. The output signal of the activation function may be used as an input of a next convolutional layer. The activation function may be a sigmoid function. The neural network is a network formed by combining a plurality of the foregoing individual neurons. In other words, an output of a neuron may be an input of another neuron. An input of each neuron may be connected to a partial receptive field of a previous layer, to extract a feature of the partial receptive field. The partial receptive field may be a region including several neurons.

(2) Deep Neural Network

A deep neural network (DNN) is also referred to as a multilayer neural network, and may be understood as a neural network having many hidden layers. Herein, "many" is not measured by a particular standard. Based on locations of different layers in the DNN, neural networks inside the DNN may be classified into three types: an input layer, hidden layers, and an output layer. Generally, a first layer is the input layer, a last layer is the output layer, and middle layers are all the hidden layers. Layers are fully connected to each other. To be specific, any neuron at an $i^{th}$ layer is definitely connected to any neuron at an $(i+1)^{th}$ layer.

Although the DNN seems to be complex, work of each layer is actually not complex and is simply represented as the following linear relationship expression: $\vec{y}=\alpha(W \cdot \vec{x} + \vec{b})$. $\vec{x}$ is an input vector, $\vec{y}$ is an output vector, $\vec{b}$ is an offset vector, W is a weight matrix (which is also referred to as a coefficient), and $\alpha(\ )$ is an activation function. For each layer, such a simple operation is performed on an input vector $\vec{x}$ to obtain an output vector $\vec{y}$. Because there are many layers for the DNN, there are also many coefficients W and offset vectors $\vec{b}$. These parameters are defined in the DNN as follows: The coefficient W is used as an example. It is assumed that in a three-layer DNN, a linear coefficient from a fourth neuron at a second layer to a second neuron at a third layer is defined as $W_{24}^3$. A superscript 3 represents a layer number for the coefficient W, and a subscript is corresponding to an output third-layer index 2 and an input second-layer index 4.

In summary, a coefficient from a $k^{th}$ neuron at an $(L-1)^{th}$ layer to a $j^{th}$ neuron at an $L^{th}$ layer is defined as $W_{jk}^L$.

It should be noted that there is no parameter W for the input layer. In the deep neural network, more hidden layers enable the network to better depict a complex case in the real world. Theoretically, a model with more parameters is more complex and has a higher "capacity", and this means that the model can accomplish more complex learning tasks. Training the deep neural network is a process of learning a weight matrix, and an ultimate objective of the training is to obtain weight matrices for all layers (weight matrices formed by vectors W of many layers) in the trained deep neural network.

(3) Convolutional Neural Network

A convolutional neural network (convolutional neuron network, CNN) is a deep neural network of a convolutional structure. The convolutional neural network includes a feature extractor constituted by a convolutional layer and a sub-sampling layer. The feature extractor may be considered as a filter, and a convolution process may be considered as performing convolution on an input image or a convolution feature map (feature map) by using a trainable filter. The convolutional layer is a neuron layer, in the convolutional neural network, that performs convolution processing on an input signal. At the convolutional layer in the convolutional neural network, one neuron may be connected to only some neurons at an adjacent layer. The convolutional layer usually includes several feature maps, and each feature map may include some neurons arranged in a shape of a rectangle. Neurons on a same feature map share a weight, and the shared weight herein is a convolution kernel. The shared weight may be understood as being unrelated to a manner and a location for extracting image information. An implicit principle thereof is: Statistical information of a part of an image is the same as that of other parts of the image. In other words, it means that image information learnt from a part can also be applied to another part. Therefore, image information obtained through same learning can be used for all locations in the image. At a same convolutional layer, a plurality of convolution kernels may be used to extract different image information. Generally, more convolution kernels mean richer image information reflected by a convolution operation.

A convolution kernel may be initiated in a form of a matrix of a random size. In a training process of the convolutional neural network, for the convolution kernel, a rational weight can be obtained through learning. In addition, direct advantages of the shared weight are reducing a quantity of connections between layers in the convolutional neural network, and reducing an overfitting risk.

(4) A recurrent neural network (recurrent neural networks, RNN) is used for processing series data. In a conventional neural network model, an execution sequence is: an input layer, a hidden layer, and an output layer, layers are fully connected to each other, and nodes at each layer are not connected. Such a common neural network has resolved many difficulties, but is still helpless to deal with many problems. For example, if a next word in a sentence is to be predicted, a previous word usually needs to be used, because words in the sentence are dependent. The RNN is referred to as a recurrent neural network for the reason that a current output is also related to a previous output in a series. A specific representation form is that the network memorizes prior information and applies the prior information to computation of a current output. To be specific, nodes at a current hidden layer are no longer unconnected but are connected instead, and an input of the hidden layer includes not only an output of the input layer but also an output of a hidden layer at a previous moment. Theoretically, the RNN can process series data of any length. Training the RNN is the same as training a conventional CNN or DNN. They all use an error back propagation learning algorithm, but a difference lies in: If network unfolding is performed on the RNN, a parameter such as W is shared; however, as shown in the foregoing example, this is not the case with the conventional neural network. In addition, during use of a gradient descent algorithm, an output of each step depends not only on a network of a current step, but also on network statuses of several previous steps. This learning algorithm is referred to as back propagation through time (back propagation through time, BPTT) algorithm.

The convolutional neural network already exists. Why is the recurrent neural network required? The answer is simple. In the convolutional neural network, there is a presupposition: Elements are independent of each other, and inputs are independent of outputs, such as a cat and a dog. However, in the real world, many elements are associated. For example, a stock varies with time. For another example, someone says: I like traveling, and my most favorite place is Yunnan. I am bound to go there if possible. If "there" is a blank to be filled in, humans should know that the blank indicates "Yunnan". This is because humans can make inferences based on context content. However, how to make a machine do this? The RNN emerges in response. The RNN intends to enable a machine to have memory like humans. Therefore, an output in the RNN needs to rely on current input information and historical memory information.

(5) Loss Function

In a process of training a deep neural network, it is expected that an output of the deep neural network is close, as much as possible, to a value that really needs to be predicted. Therefore, a predicted value of the current network and a really expected target value may be compared, and a weight vector of each layer of neural network is updated (certainly, an initialization process is usually performed before updating for the first time, that is, a parameter is preconfigured for each layer in the deep neural network) based on a difference between the predicted value and the target value. For example, if a predicted value of the network is excessively high, a weight vector is adjusted to make the predicted value smaller, and adjustments are made continually until a really expected target value or a value that is quite close to the really expected target value can be predicted in the deep neural network. Therefore, "how to determine a difference between a predicted value and a target value" needs to be predefined. In this case, a loss function (loss function) or an objective function (objective function) can be used. The functions are important equations for measuring a difference between a predicted value and a target value. Using the loss function as an example, a larger output value (loss) of the loss function indicates a larger difference. Then, training the deep neural network is a process of reducing the loss as much as possible.

(6) Back Propagation Algorithm

An error back propagation (back propagation, BP) learning algorithm may be used in a convolutional neural network to modify a value of a parameter in an initial super-resolution model in a training process, so that a reconstruction error loss for the super-resolution model becomes smaller. Specifically, an error loss occurs during forward propagation and output of an input signal. In this case, error loss information is back-propagated to update the parameter in the initial super-resolution model, so that the error loss converges. The back propagation algorithm is an error loss-oriented back propagation process with an objective of obtaining an optimal parameter for the super-resolution model, such as a weight matrix.

(7) Pixel Value

A pixel value of an image may be a red-green-blue (RGB) color value, and the pixel value may be a long integer indicative of a color. For example, a pixel value is 256×Red+100×Green+76×Blue. Blue represents a blue component, Green represents a green component, and Red represents a red component. For the color components, a smaller value indicates higher brightness, and a larger value indicates lower brightness. For a grayscale image, the pixel value may be a grayscale value.

As shown in FIG. 1, an embodiment of this application provides a system architecture 100. In FIG. 1, a data collection device 160 is configured to collect training data. In this embodiment of this application, the training data includes an original image (the original image herein may be an image containing a small amount of noise) and a noise image that is obtained after noise is added to the original image). The original image may be an image containing a small amount of noise.

After the training data is collected, the data collection device 160 stores the training data into a database 130, and a training device 120 performs training based on the training data maintained in the database 130, to obtain a target model/rule 101.

The following describes obtaining of the target model/rule 101 by the training device 120 based on the training data. The training device 120 processes the input original image, and compares an output image with the original image, until a difference between the image output by the training device 120 and the original image is less than a specific threshold. In this way, training for the target model/rule 101 is completed.

The target model/rule 101 can be used to implement the image denoising method in the embodiments of this application. To be specific, related processing is performed on a to-be-processed image, and then a processed image is input to the target model/rule 101, so as to obtain a denoised image. The target model/rule 101 in this embodiment of this application may specifically be a neural network. It should be noted that in actual application, the training data maintained in the database 130 is not necessarily all collected by the data collection device 160, and may be received from another device. It should also be noted that, the training device 120 does not necessarily perform training to obtain the target model/rule 101 completely based on the training data maintained in the database 130, and may perform model training by obtaining training data from a cloud client or another place. The foregoing description shall not constitute any limitation on this embodiment of this application.

The target model/rule 101 obtained through training by the training device 120 can be applied to different systems or devices, for example, applied to an execution device 110 shown in FIG. 1. The execution device 110 may be a terminal such as a mobile phone terminal, a tablet computer, a notebook computer, an augmented reality (augmented reality, AR) AR/virtual reality (virtual reality, VR), or a vehicle-mounted terminal; or may be a server, Cloud, or the like. In FIG. 1, an input/output (input/output, I/O) interface 112 is configured for the execution device 110, and is configured to exchange data with an external device. A user may enter data to the I/O interface 112 by using customer equipment 140. The input data in this embodiment of this application may include a to-be-processed image input by the customer equipment.

A preprocessing module 113 and a preprocessing module 114 are configured to preprocess the input data (for example, the to-be-processed image) received by the I/O interface 112. In this embodiment of this application, alternatively, there is no preprocessing module 113 and preprocessing module 114 (or there may be either of the preprocessing modules), and a computation module 111 is directly used to process the input data instead.

When the execution device 110 preprocess the input data, or when the computation module 111 of the execution device 110 performs related processing such as computation, the execution device 110 may invoke data, code, and the like in a data storage system 150 to perform corresponding processing, or may store data, an instruction, and the like that are obtained through corresponding processing into the data storage system 150.

Finally, the I/O interface 112 returns a processing result such as the obtained denoised image to the customer equipment 140, to provide the processing result for the user.

It should be noted that the training device 120 may generate corresponding target model/rules 101 for different objectives or different tasks based on different training data. Then, the corresponding target model/rules 101 may be used to achieve the objectives or accomplish the tasks, to provide a required result for the user.

In the case shown in FIG. 1, the user may enter data through manual designation, where the manual designation may be performed by using a screen provided on the I/O interface 112. In another case, the customer equipment 140 may automatically send input data to the I/O interface 112. If it is required that user permission should be obtained for the customer equipment 140 to automatically send input data, the user may set corresponding permission in the customer equipment 140. The user may view, in the customer equipment 140, a result output by the execution device 110. A specific presentation form may be displaying, sound, action, or another specific manner. The customer equipment 140 may also be used as a data collection end to collect, as new sample data, input data of an input I/O interface 112 and an output result of an output I/O interface 112 that are shown in the figure, and store the new sample data into the database 130. Certainly, alternatively, the customer equipment 140 may not perform collection, and the I/O interface 112 directly uses, as new sample data, the input data of the input I/O interface 112 and the output result of the output I/O interface 112 that are shown in the figure, and stores the new sample data into the database 130.

It should be noted that FIG. 1 is merely a schematic diagram of a system architecture according to this embodiment of this application, and a location relationship between a device, a component, and a module that are shown in the figure does not constitute any limitation. For example, in FIG. 1, the data storage system 150 is an external memory relative to the execution device 110. In other cases, the data storage system 150 may alternatively be disposed in the execution device 110.

As shown in FIG. 1, the target model/rule 101 is obtained through training by the training device 120. In this embodiment of this application, the target model/rule 101 may be a neural network in this application. Specifically, the neural network provided in this embodiment of this application may be a CNN, a deep convolutional neural network (deep convolutional neural networks, DCNN), a recurrent neural network (recurrent neural network, RNNS), or the like.

Figure 2:
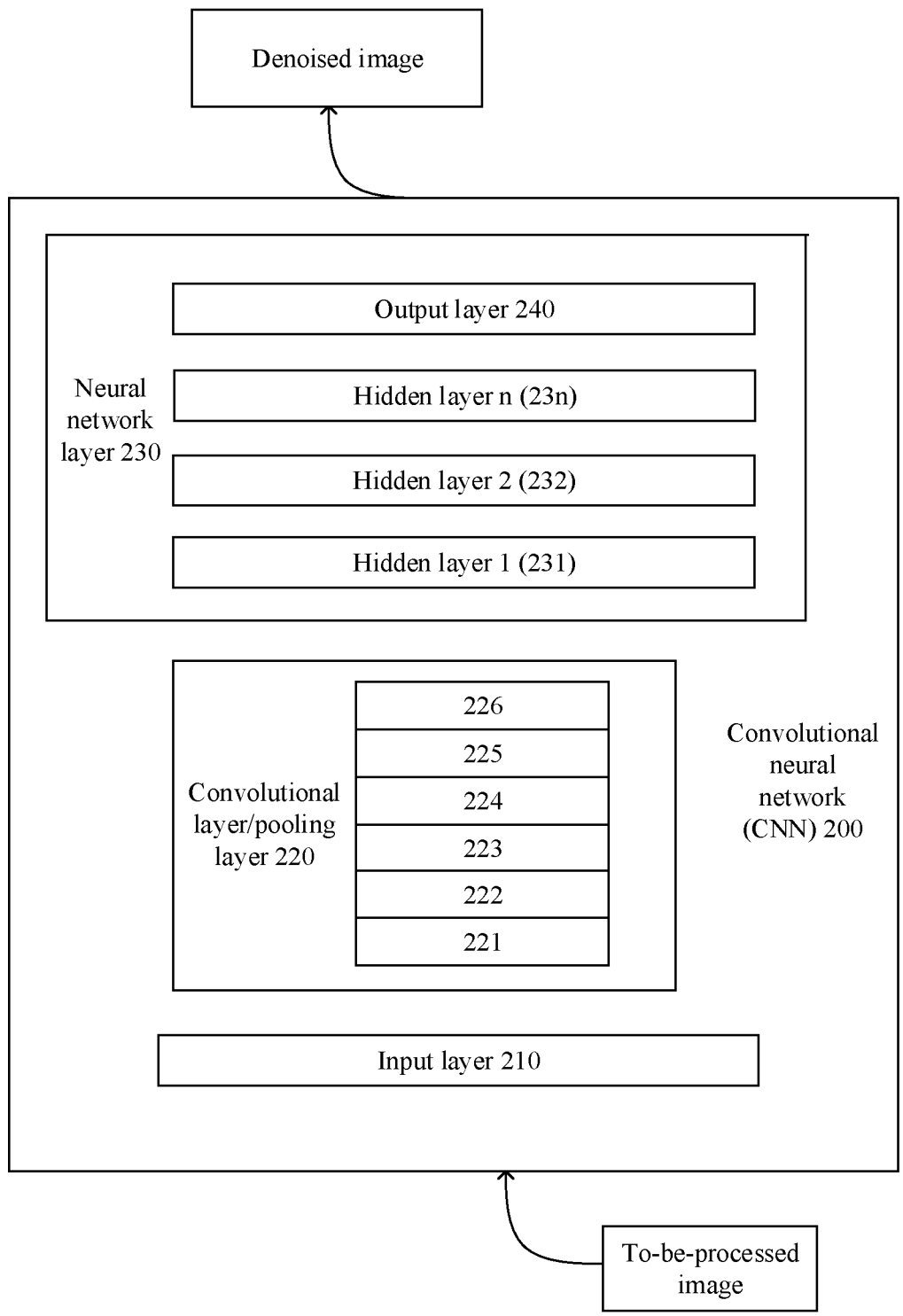
FIG. 2 is a schematic diagram of image denoising performed based on a CNN model according to an embodiment of this application.

Because the CNN is a quite common neural network, the following mainly details a CNN structure with reference to FIG. 2. As described in the foregoing basic concepts, the convolutional neural network is a deep neural network of a convolutional structure, and is a deep learning (deep learning) architecture. The deep learning architecture means that multi-level learning is conducted at different abstraction layers by using a machine learning algorithm. As a deep learning architecture, the CNN is a feed-forward (feedforward) artificial neural network. Each neuron in the feed-forward artificial neural network can respond to an image input to the neuron.

As shown in FIG. 2, the convolutional neural network (CNN) 200 may include an input layer 210, a convolutional layer/pooling layer 220 (the pooling layer is optional), and a neural network layer 230. The following details related content of these layers.

Convolutional Layer/Pooling Layer 220:
Convolutional Layer:

The convolutional layer/pooling layer 220 shown in FIG. 2 may include layers 221 to 226 used as examples. For example, in an implementation, the layer 221 is a convolutional layer, the layer 222 is a pooling layer, the layer 223 is a convolutional layer, the layer 224 is a pooling layer, the layer 225 is a convolutional layer, and the layer 226 is a pooling layer. In another implementation, the layers 221 and 222 are convolutional layers, the layer 223 is a pooling layer, the layers 224 and 225 are convolutional layers, and the layer 226 is a pooling layer. In other words, an output of a convolutional layer may be used as an input of its subsequent pooling layer, or may be used as an input of another convolutional layer, to continue performing a convolution operation.

The following uses the convolutional layer 221 as an example to describe an internal working principle of one convolutional layer.

The convolutional layer 221 may include many convolution operators. The convolution operator is also referred to as a kernel, and a function of the convolution operator in image processing is equivalent to a filter that extracts specific information from an input image matrix. The convolution operator may be a weight matrix in essence, and the weight matrix is usually predefined. In a process of performing a convolution operation on an image, the weight matrix usually processes, on the input image, one pixel after another (or two pixels after other two pixels, and so on; it depends on a value of a stride) in a horizontal direction, so as to complete extraction of a specific feature from the image. A size of the weight matrix needs to be related to an image size. It should be noted that a depth dimension (depth dimension) of the weight matrix is the same as that of the input image. In a convolution computation process, the weight matrix is extended to an entire depth of the input image. Therefore, convolution with a single weight matrix generates a convolutional output of a single depth dimension. However, in most cases, a single weight matrix is not used, but a plurality of weight matrices of a same size (row×column), that is, a plurality of cophenetic matrices, are used. Outputs of the weight matrices are stacked to form a depth dimension of a convolution image. The dimension herein may be understood as being dependent on the "plurality of" described above. Different weight matrices may be used to extract different features in an image. For example, one weight matrix is used to extract edge information of the image, one weight matrix is used to extract a specific color of the image, and another weight matrix is used to obscure unwanted noise in the image, etc. The plurality of weight matrices are equal in size (row×column). After extraction is performed by using the plurality of weight matrices of the same size, obtained feature maps are also equal in size, and the plurality of extracted feature maps of the same size are concatenated to form an output of the convolution computation.

A weight in these weight matrices needs to be obtained through a large amount of training in actual application. Each weight matrix formed by using the weight obtained through training may be used to extract information from the input image, so that the convolutional neural network 200 makes a prediction correctly.

When the convolutional neural network 200 has a plurality of convolutional layers, an initial convolutional layer (for example, 221) usually extracts a relatively large quantity of common features, where the common features may also be referred to as low-level features. As a depth of the convolutional neural network 200 becomes deeper, a feature extracted by a deeper convolutional layer (for example, 226) is more complex, for example, a feature such as high-level semantics. A higher-level semantic feature is more suitable for resolving problems.

Pooling Layer:

A quantity of training parameters usually needs to be reduced, and therefore a pooling layer usually needs to be periodically used after a convolutional layer. For the layers 221 to 226 used as example for 220 in FIG. 2, one convolutional layer may be followed by one pooling layer, or a plurality of convolutional layers may be followed by one or more pooling layers. During image processing, a unique function of a pooling layer is to reduce image space. The pooling layer may include a mean pooling operator and/or a maximum pooling operator for performing sampling on an input image, to obtain an image of a smaller size. The mean pooling operator may be used to compute a pixel value in an image within a specific range, to obtain a mean value as a mean pooling result. The maximum pooling operator may be used to select, within a specific range, a maximum pixel in the range as a maximum pooling result. In addition, a size of a weight matrix in a convolutional layer needs to be related to an image size, and similarly, an operator in a pooling layer also needs to be related to the image size. A size of an image that is output after being processed by a pooling layer may be less than a size of the image that is input to the pooling layer. Each pixel in the image that is output from the pooling layer indicates a mean value or a maximum value of a corresponding sub-region of the image that is input to the pooling layer.

Neural Network Layer 230:

After processing is performed by the convolutional layer/pooling layer 220, the convolutional neural network 200 is insufficient to output required output information. This is because, as described above, the convolutional layer/pooling layer 220 can only perform feature extraction and reduce a quantity of parameters caused by the input image. However, to generate final output information (required class information or other related information), the convolutional neural network 200 needs to use the neural network layer 230 to generate one or one group of outputs whose quantity is equal to a quantity of required classes. Therefore, the neural network layer 230 may include a plurality of hidden layers (231, 232, . . . 23n shown in FIG. 2) and an output layer 240. Parameters included in the plurality of hidden layers may be obtained through pre-training based on related training data of specific task types. For example, the task types may include image recognition, image classification, and image super-resolution reconstruction.

The plurality of hidden layers in the neural network layer 230 is followed by the output layer 240, that is, a last layer in the entire convolutional neural network 200. The output layer 240 has a loss function similar to a classification cross entropy, which is specifically used to compute a prediction error. Once forward propagation (as shown in FIG. 2, propagation in a direction from 210 to 240 is the forward propagation) in the entire convolutional neural network 200 is completed, a weight and a deviation of each layer that are mentioned above start to be updated through back propagation (as shown in FIG. 2, propagation in a direction from 240 to 210 is the back propagation), to reduce a loss of the convolutional neural network 200 and an error between a result that is output by the convolutional neural network 200 by using the output layer and an ideal result.

It should be noted that the convolutional neural network 200 shown in FIG. 2 is merely used as an example of the convolutional neural network. In specific application, the convolutional neural network may alternatively exist in a form of another network model.

Figure 3:
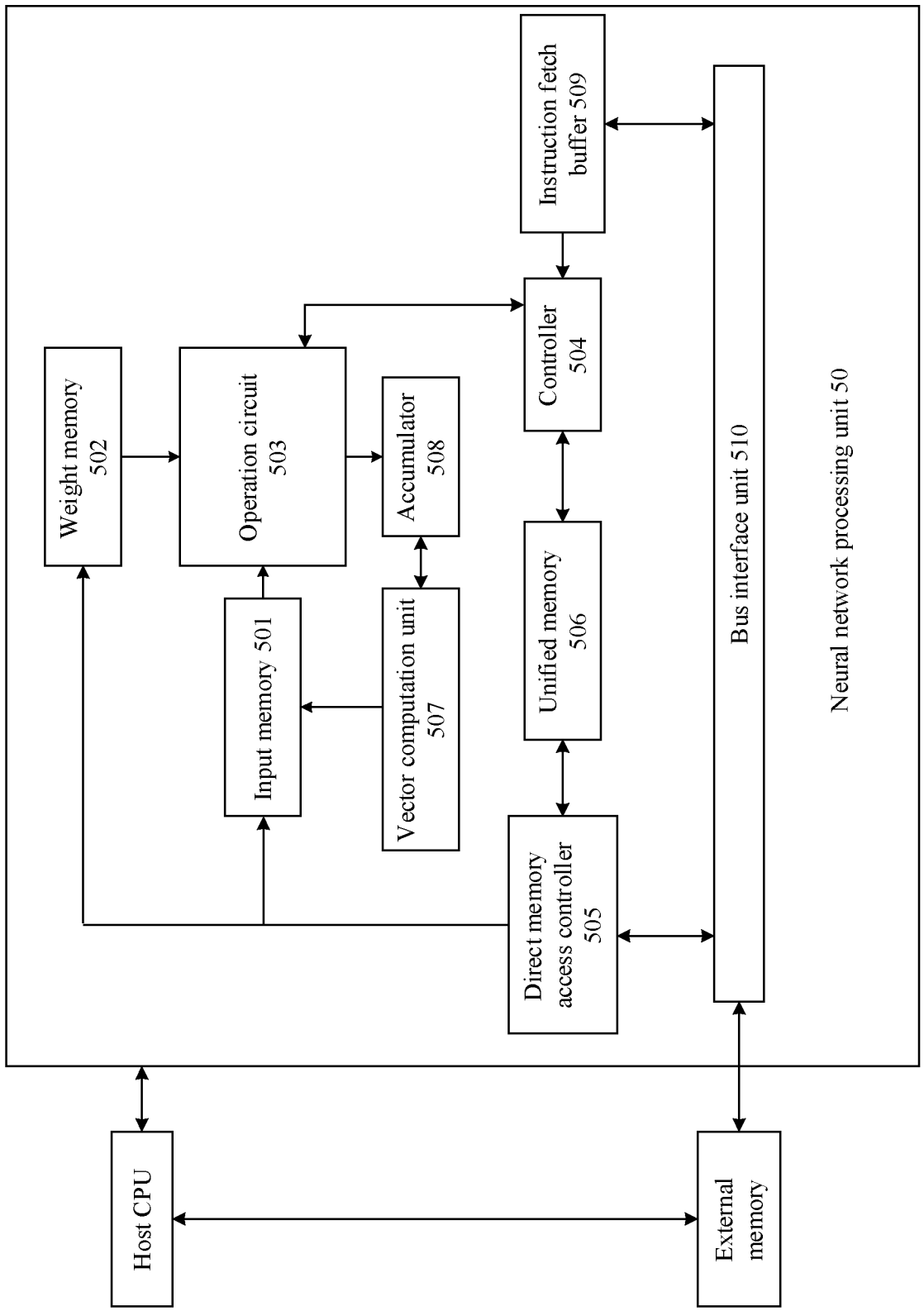
FIG. 3 is a schematic diagram of a hardware structure of a chip according to an embodiment of this application.

FIG. 3 shows a hardware structure of a chip according to an embodiment of this application. The chip includes a neural network processing unit 50. The chip may be disposed in the execution device 110 shown in FIG. 1, and is configured to complete computation work of the computation module 111. Alternatively, the chip may be disposed in the training device 120 shown in FIG. 1, and is configured to complete training work of the training device 120 and output the target model/rule 101. An algorithm for each layer in the convolutional neural network shown in FIG. 2 may be implemented by the chip shown in FIG. 3.

The neural network processing unit NPU 50 NPU that serves as a coprocessor is mounted on a host CPU (host CPU), and the host CPU allocates a task. A core part of the NPU is an operation circuit 50, and a controller 504 controls the operation circuit 503 to extract data from a memory (a weight memory or an input memory) and to perform an operation.

In some implementations, the operation circuit 503 includes a plurality of processing engines (process engine, PE). In some implementations, the operation circuit 503 is a two-dimensional systolic array. Alternatively, the operation circuit 503 may be a one-dimensional systolic array, or another electronic circuit that can perform mathematical operations such as multiplication and addition. In some implementations, the operation circuit 503 is a general-purpose matrix processor.

For example, it is assumed that there are an input matrix A, a weight matrix B, and an output matrix C. The operation circuit extracts corresponding data of the matrix B from the weight memory 502, and buffers the corresponding data into each PE in the operation circuit. The operation circuit extracts data of the matrix A from the input memory 501, and performs a matrix operation between the data of the matrix A and the matrix B to obtain a partial matrix result or a final matrix result, and stores the result into an accumulator (accumulator) 508.

A vector computation unit 507 may perform further processing on the output of the operation circuit, for example, perform vector multiplication, vector addition, an exponential operation, a logarithmic operation, and value comparison. For example, the vector computation unit 507 may be used for non-convolutional layer/non-FC layer network computation in a neural network, such as pooling (pooling), batch normalization (batch normalization), and local response normalization (local response normalization).

In some implementations, the vector computation unit 507 can store a processed output vector into a unified buffer 506. For example, the vector computation unit 507 may apply a nonlinear function to the output of the operation circuit 503, for example, a vector of an accumulated value, to generate an activation value. In some implementations, the vector computation unit 507 generates a normalized value, a combined value, or a normalized value and a combined value. In some implementations, the processed output vector can be used as an activation input to the operation circuit 503, for example, used by a subsequent layer in the neural network.

The unified memory 506 is configured to store input data and output data.

Input data in an external memory is migrated to the input memory 501 and/or the unified memory 506 directly by using a direct memory access controller (direct memory access controller, DMAC) 505, weight data in the external memory is stored into the weight memory 502, and data in the unified memory 506 is stored into the external memory.

A bus interface unit (bus interface unit, BIU) 510 is configured to implement interaction between the host CPU, the DMAC, and an instruction fetch buffer 509 through a bus.

The instruction fetch buffer (instruction fetch buffer) 509 connected to the controller 504 is configured to store an instructed to be used by the controller 504.

The controller 504 is configured to invoke the instruction buffered in the instruction fetch buffer 509, to control a working process of an operation accelerator.

Generally, the unified memory 506, the input memory 501, the weight memory 502, and the instruction fetch buffer 509 are all on-chip (On-Chip) memories, and the external memory is a memory outside the NPU. The external memory may be a double data rate synchronous dynamic random access memory (double data rate synchronous dynamic random access memory, DDR SDRAM for short), a high bandwidth memory (high bandwidth memory, HBM), or another readable and writable memory.

An operation for each layer in the convolutional neural network shown in FIG. 2 may be performed by an operation circuit 303 or a vector computation unit 307.

The execution device 110 in FIG. 1 described above can perform the steps of the image denoising method in the embodiments of this application, and the CNN model shown in FIG. 2 and the chip shown in FIG. 3 may also be configured to perform the steps of the image denoising method in the embodiments of this application. The following details the image denoising method in the embodiments of this application with reference to the accompanying drawings.

Figure 4:
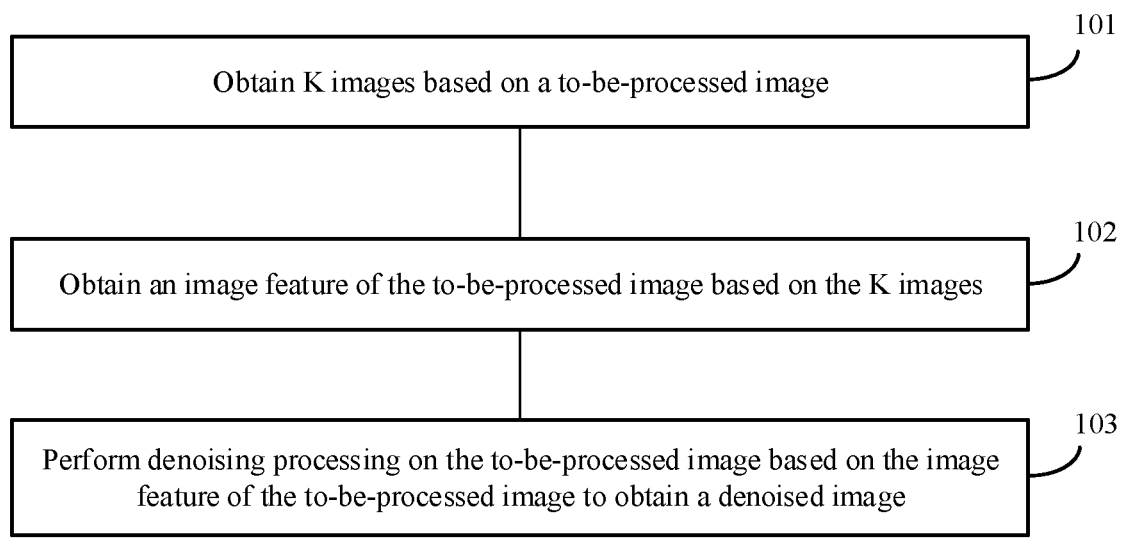
FIG. 4 is a schematic flowchart of an image denoising method according to an embodiment of this application.

FIG. 4 is a schematic flowchart of an image denoising method according to an embodiment of this application. The method shown in FIG. 4 may be performed by an image denoising apparatus. The image denoising apparatus herein may be an electronic device having an image processing function. The electronic device may specifically be a mobile terminal (for example, a smartphone), a computer, a personal digital assistant, a wearable device, a vehicle-mounted device, an Internet-of-Things device, or another device capable of performing image processing.

The method shown in FIG. 4 includes steps 101 to 103. The following separately details these steps.

101. Obtain K images based on a to-be-processed image.

The K images are images obtained by reducing a resolution of the to-be-processed image, or the K images are images obtained by performing resolution reduction processing on the to-be-processed image, where K is a positive integer.

The resolution reduction processing may specifically be a shuffle operation or a downsampling operation.

For ease of solution descriptions, the K images and the to-be-processed image may be numbered. Specifically, the K images may be numbered as a first image to a $K^{th}$ image, and the to-be-processed image may be numbered as a $(K+1)^{th}$ image. The K images and the to-be-processed image compose (K+1) images.

In the (K+1) images, image resolutions of the first image to the $(K+1)^{th}$ image are in ascending order (in the (K+1) images, a larger image number indicates a higher resolution), where the first image is an image with a lowest resolution among the (K+1) images, and the $(K+1)^{th}$ image is an image with a highest resolution among the (K+1) images.

In other words, when the (K+1) images include an $i^{th}$ image and an $(i+1)^{th}$ image, a resolution of the $i^{th}$ image is lower than that of the $(i+1)^{th}$ image, where i is a positive integer less than or equal to K.

102. Obtain an image feature of the to-be-processed image based on the K images.

It should be understood that in this application, the K images are the images obtained by reducing the resolution of the to-be-processed image, and the (K+1) images include the K images and the to-be-processed image.

In addition, an image feature of the $(i+1)^{th}$ image in the (K+1) images is extracted based on an image feature of the $i^{th}$ image in the (K+1) images.

Optionally, the obtaining an image feature of the to-be-processed image based on the K images includes:
  step 1: obtaining the image feature of the $i^{th}$ image; and
  step 2: extracting the image feature of the $(i+1)^{th}$ image based on the image feature of the $i^{th}$ image.

Step 1 and step 2 are repeated to obtain the image feature of the $(K+1)^{th}$ image.

In a process of obtaining the image feature of the $(K+1)^{th}$ image, an image feature of the first image may be first obtained by performing convolution processing on the first image, and then an image feature of a second image may be extracted based on the image feature of the first image. A similar process is continually performed until the image feature of the $(K+1)^{th}$ image is extracted based on an image feature of the $K^{th}$ image.

In the foregoing process, an image feature of a lower-resolution image is used to provide guidance on extraction of an image feature of a higher-resolution image, and therefore global information of the to-be-processed image can be sensed as much as possible in the process of extracting the image feature of the higher-resolution image. In this way, the image feature extracted for the higher-resolution image is more accurate.

It should be understood that in the process of obtaining the image feature of the to-be-processed image, after the image feature of the high-resolution image is extracted based on the image feature of the low-resolution image, the image feature of the low-resolution image may not be stored any longer. This can reduce storage overheads to some extent.

For example, after the image feature of the second image is extracted based on the image feature of the first image, the image feature of the first image may not be stored any longer and only the image feature of the second image needs to be stored. After an image feature of a third image is extracted based on the image feature of the second image, the image feature of the second image may not be stored any longer and only the image feature of the third image needs to be stored. A similar process is performed until the image feature of the to-be-processed image is obtained. In other words, at any moment in the process of obtaining the image feature of the to-be-processed image based on the K images, only an image feature of an image currently with a higher resolution may be stored. This can reduce storage overheads to some extent.

103. Perform denoising processing on the to-be-processed image based on the image feature of the to-be-processed image to obtain a denoised image.

Optionally, the performing denoising processing on the to-be-processed image based on the image feature of the to-be-processed image to obtain a denoised image includes: performing convolution processing on the image feature of the to-be-processed image to obtain a residual estimated value of the to-be-processed image; and superimposing the residual estimated value of the to-be-processed image on the to-be-processed image to obtain the denoised image.

In this application, an image feature of a low-resolution image is used to provide guidance on extraction of an image feature of a high-resolution image, and therefore global information of the to-be-processed image can be sensed as much as possible in a process of extracting the image feature of the high-resolution image. In this way, the extracted image feature of the high-resolution image is more accurate, so that a better denoising effect is achieved during image denoising performed based on the image feature of the to-be-processed image.

It should be understood that in the process of obtaining the image feature of the to-be-processed image based on the K images, the image feature of the first image needs to be first obtained, the image feature of the second image is obtained based on the image feature of the first image, the image feature of the third image is obtained based on the image feature of the second image, and so on. This process is equivalent to obtaining the image features of the first image to the $(K+1)^{th}$ image (the to-be-processed image).

For a clear understanding of an image feature obtaining process, the following uses the $(i+1)^{th}$ image as an example to detail a process of obtaining the image feature of the $(i+1)^{th}$ image.

Optionally, the obtaining the image feature of the $(i+1)^{th}$ image includes: extracting the image feature of the $(i+1)^{th}$ image based on the image feature of the $i^{th}$ image.

Specifically, the extracting the image feature of the $(i+1)^{th}$ image based on the image feature of the $i^{th}$ image includes: performing convolution processing on the $(i+1)^{th}$ image by using a first convolutional layer to an $n^{th}$ convolutional layer in N convolutional layers, to obtain an initial image feature of the $(i+1)^{th}$ image; fusing the initial image feature of the $(i+1)^{th}$ image with the image feature of the $i^{th}$ image to obtain a fused image feature; and performing convolution processing on the fused image feature by using an $(n+1)^{th}$ convolutional layer to an $N^{th}$ convolutional layer in the N convolutional layers, to obtain the image feature of the $(i+1)^{th}$ image.

Both n and N are positive integers, n is less than or equal to N, and N is a total quantity of convolutional layers used when the image feature of the $(i+1)^{th}$ image is extracted.

The smaller a value of n is, the sooner the initial image feature of the $(i+1)^{th}$ image can be obtained and the sooner the initial image feature of the $(i+1)^{th}$ image can be fused with the image feature of the $i^{th}$ image, so that the finally obtained image feature of the $(i+1)^{th}$ image is more accurate.

Optionally, n is equal to 1.

When n is equal to 1, after convolution processing is performed on the $(i+1)^{th}$ image for one time (the initial image feature of the $(i+1)^{th}$ image is obtained after convolution processing is performed for one time), the obtained initial image feature of the $(i+1)^{th}$ image may be fused with the image feature of the $i^{th}$ image, so that the finally obtained image feature of the $(i+1)^{th}$ image is more accurate.

When resolution reduction processing is being performed on the to-be-processed image, a downsampling operation, a shuffle operation, or another manner may be used to obtain the K images.

Optionally, the obtaining K images based on a to-be-processed image includes: performing downsampling operations on the to-be-processed image for K times, to obtain the first image to the $K^{th}$ image.

By performing the downsampling operations, the resolution of the to-be-processed image can be reduced, and image content of the first image to the $K^{th}$ image can be reduced. This can reduce an amount of computation during feature extraction.

In addition, during the downsampling operations, alternatively, one downsampling operation may first be performed on the to-be-processed image to obtain the K images, the $K^{th}$ image is duplicated, and a downsampling operation is performed on the duplicated $K^{th}$ image to obtain an $(K-1)^{th}$ image. A similar process is performed until the first image is obtained.

However, a loss of image information occurs when a low-resolution image is obtained by performing a downsampling operation. Therefore, to reduce a loss of image content, a shuffle operation manner may further be used to obtain a higher-resolution image.

Optionally, the obtaining K images based on a to-be-processed image includes: performing shuffle operations on the to-be-processed image for K times, to obtain the first image to the $K^{th}$ image.

The shuffle operations herein are equivalent to adjustments of the resolution and a channel quantity of the to-be-processed image, so as to obtain images whose resolutions and channel quantities are different from those of the original to-be-processed image.

A resolution and a channel quantity of any image in the first image to the $K^{th}$ image are different from those of the to-be-processed image. The resolution of the $i^{th}$ image in the K images obtained by performing the shuffle operations is lower than that of the to-be-processed image, and a channel quantity of the $i^{th}$ image is determined based on the channel quantity of the to-be-processed image, the resolution of the $i^{th}$ image, and the resolution of the to-be-processed image.

Specifically, the channel quantity of the $i^{th}$ image may be determined based on the channel quantity of the to-be-processed image and a ratio of the resolution of the $i^{th}$ image to the resolution of the to-be-processed image.

The first image to the $K^{th}$ image are obtained by performing the shuffle operations, and the image information can be retained when a low-resolution image is obtained based on the to-be-processed image, so that a relatively accurate image feature can be extracted during feature extraction.

It should be understood that in this application, before the K images are obtained based on the to-be-processed image, a value of K and a resolution of each of the K images may be preset. In this way, the K images whose resolutions are the preset resolutions can be obtained by performing resolution reduction processing on the to-be-processed image.

For example, if the resolution of the to-be-processed image is M×N, two images may be generated based on the to-be-processed image, and resolutions of the two images may be M/2×N/2 and M/4×N/4.

Optionally, a ratio of the channel quantity of the $i^{th}$ image to the channel quantity of the to-be-processed image is less than or equal to the ratio of the resolution of the $i^{th}$ image to the resolution of the to-be-processed image.

It is assumed that the channel quantity of the $i^{th}$ image is Ci, the channel quantity of the to-be-processed image is C, the resolution of the $i^{th}$ image is Mi×Ni, and the resolution of the to-be-processed image is M×N. In this case, the ratio of the channel quantity of the $i^{th}$ image to the channel quantity of the to-be-processed image is Ci/C, and the ratio of the resolution of the $i^{th}$ image to the resolution of the to-be-processed image is (Mi×Ni)/(M×N).

When the ratio of the channel quantity of the $i^{th}$ image to the channel quantity of the to-be-processed image is equal to the ratio of the resolution of the $i^{th}$ image to the resolution of the to-be-processed image, image content can remain unchanged during obtaining of the $i^{th}$ image based on the to-be-processed image, so that the extracted image feature of the $i^{th}$ image is more accurate (in comparison with a case in which image content is lost, the extracted image feature is more accurate).

For a better understanding of a correspondence between channel quantities and resolutions of the to-be-processed image and the K images, the following provides a description by using a specific instance.

For example, specifications of the to-be-processed image are M×N×C (where the resolution is M×N and the channel quantity is C), and specifications of the $i^{th}$ image may be $M/2^i \times N/2^i \times 4^i C$ (where the resolution is $M/2^i \times N/2^i$ and the channel quantity is $4^i C$). In other words, a ratio of the resolution of the to-be-processed image to the resolution of the $i^{th}$ image is $4^i$, and the ratio of the channel quantity of the $i^{th}$ image to the channel quantity of the to-be-processed image is $4^i$, which is exactly the same as the ratio of the resolution of the to-be-processed image to the resolution of the $i^{th}$ image, so that image content of the $i^{th}$ image keeps consistent with that of the to-be-processed image. This avoids a loss of the image information, making the extracted image feature relatively accurate.

It should be understood that the foregoing provides a description by using an example in which the resolution of the to-be-processed image varies by a multiple of 2. Actually, during obtaining of the $i^{th}$ image based on the to-be-processed image, an image resolution may alternatively vary by another multiple (for example, a multiple of 3 or 4). This is not limited herein.

Optionally, the obtaining the image features of the first image to the $(K+1)^{th}$ image includes: obtaining the image features of the first image to the $(K+1)^{th}$ image by using a neural network.

The neural network may be a CNN, a DCNN, an RNNS, or the like.

The neural network may include a top sub-network (top sub-network), a middle sub-network (middle sub-networks), and a bottom sub-network (bottom sub-networks).

It should be understood that in this application, the image feature of the to-be-processed image can be obtained by using the neural network, and denoising processing can further be performed on the to-be-processed image based on the image feature of the to-be-processed image, to obtain the denoised image.

The neural network herein may be a neural network obtained through training by using training data, and the training data herein may include an original image and a noise image that is obtained after noise is added to the original image. In a training process, the noise image is input to the neural network, and denoising processing is performed on the noise image, to obtain an output image; the obtained output image is compared with the original image, and a corresponding neural network parameter when a difference between the output image and the original image is less than a preset threshold is determined as a final parameter of the neural network; and then the neural network may be used to perform the image denoising method in this embodiment of this application.

For a specific structure, a form, and other information of the neural network herein, refer to the foregoing related content described in FIG. 1 to FIG. 3.

Optionally, the obtaining the image features of the first image to the $(K+1)^{th}$ image by using a neural network includes: obtaining the image feature of the first image by using the top sub-network; obtaining the image features of the second image to the $K^{th}$ image by using the middle sub-network; and obtaining the image feature of the $(K+1)^{th}$ image by using the bottom sub-network.

The top sub-network may be denoted as $f^1(\cdot)$, and the top sub-network is used to process the first image, to obtain the image feature of the first image;

the middle sub-network may be denoted as $\{f^k(\cdot)\}_{k=2,\ldots,K}$, and the middle sub-network is used to process the second image to the $K^{th}$ image, to obtain the image features of the second image to the $K^{th}$ image; and the bottom sub-network may be denoted as $f^{k+1}(\cdot)$, and the top sub-network is used to process the $(K+1)^{th}$ image, to obtain the image feature of the $(K+1)^{th}$ image.

It should be understood that there is one top sub-network, one bottom sub-network, and (K−1) middle sub-networks. Each middle sub-network is used to process a corresponding image to obtain an image feature of the image. In addition, the top sub-network needs to extract only the image feature of the first image, while the middle sub-networks and the bottom sub-network need to fuse, in addition to extracting the image features of the images, a lower-resolution image feature with a higher-resolution image feature, to finally obtain the image features of the images.

Figure 5:
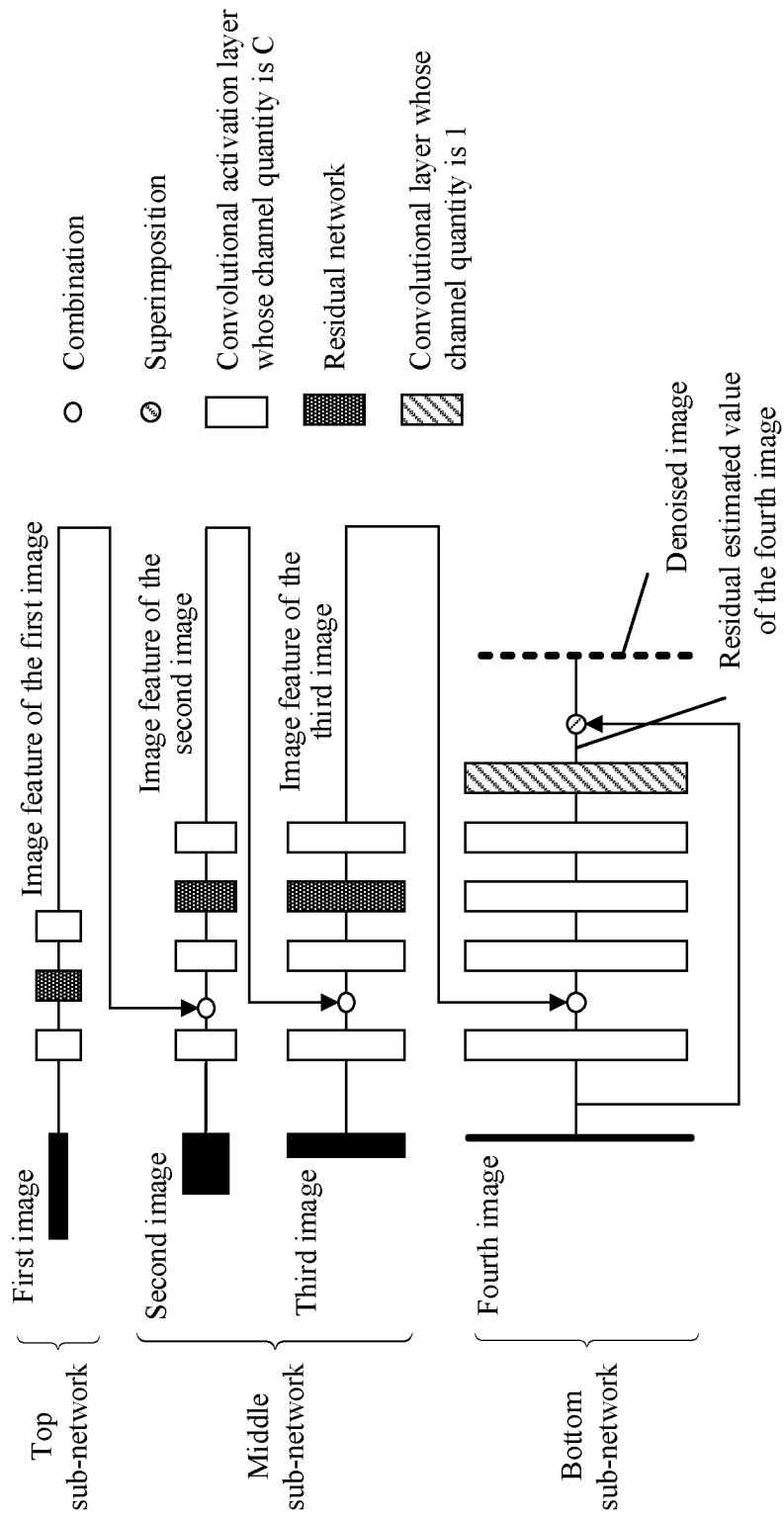
FIG. 5 is a schematic diagram of extracting image features by using sub-networks in a neural network.

The following briefly describes image feature extraction processes of the top sub-network, the middle sub-networks, and the bottom sub-network with reference to FIG. 5.

A neural network in FIG. 5 includes one top sub-network, one bottom sub-network, and two middle sub-networks. Structures or compositions of these sub-networks are as follows:

the top sub-network includes one residual network (the residual network in this application may also be referred to as a residual block) and two convolutional activation layers;

each of the middle sub-networks includes one residual network and three convolutional activation layers; and the bottom sub-network includes one convolutional activation layer and one convolutional layer whose channel quantity is 1.

The convolutional activation layer includes a convolutional layer whose channel quantity is C and an activation layer. There are two middle sub-networks, and structures of the two middle sub-networks are the same.

It should be understood that the top sub-network, the middle sub-networks, and the bottom sub-network each may be a relatively integral neural network including an input layer, an output layer, and the like. A specific structure of each of the top sub-network, the middle sub-networks, and the bottom sub-network may be similar to that of the convolutional neural network (CNN) 200 in FIG. 2.

The residual network may be considered as a special deep neural network. In brief, the residual network may be as follows: A plurality of hidden layers in the deep neural network are connected to each other layer by layer. For example, a first hidden layer is connected to a second hidden layer, the second hidden layer is connected to a third hidden layer, and the third hidden layer is connected to a fourth hidden layer (this is a data operation path of the neural network, and may also be vividly referred to as neural network transmission). In addition, the residual network also includes a direct-connect branch. The direct-connect branch directly connects the first hidden layer to the fourth hidden layer. To be specific, data of the first hidden layer is directly transmitted to the fourth hidden layer for computation, without being processed by the second hidden layer and the third hidden layer.

In addition, in this application, to facilitate processing performed by the middle sub-networks on an image feature that comes from the top sub-network, the bottom sub-network processes image features that come from the middle sub-networks. There may be a specific preset relationship between quantities of feature maps of the sub-networks.

For example, assuming that a quantity of feature maps of the bottom sub-network is $c^0$, a quantity of feature maps of the top sub-network may be set to $C^K=2Kc^0$.

It should be understood that the structures of the sub-networks in FIG. 5 are merely examples. Specific structures of the sub-networks are not limited in this application.

In the neural network shown in FIG. 5, image features of a first image to a fourth image (the fourth image is a to-be-processed image) need to be extracted (this is a case in which K=3), where image resolutions of the first image to the fourth image are in ascending order.

The image feature extraction processes of the sub-networks in FIG. 5 are as follows:

an image feature extraction process of the top sub-network:

performing, by the top sub-network, convolution processing on the first image to obtain an image feature of the first image;

an image feature extraction process of the first middle sub-network:

performing convolution processing on a second image for one time by using a convolutional activation layer in the first middle sub-network, to obtain an initial image feature of the second image; concatenating (can also be called fusing) the initial image feature of the second image with the image feature of the first image; and performing convolution processing on a concatenated image feature to obtain an image feature of the second image;

an image feature extraction process of the second middle sub-network:

performing convolution processing on a third image for one time by using a convolutional activation layer in the middle sub-network, to obtain an initial image feature of the third image; concatenating the initial image feature of the third image with the image feature of the second image; and performing convolution processing on a concatenated image feature to obtain an image feature of the third image; and an image feature extraction process of the bottom sub-network:

performing convolution processing on the fourth image for one time by using a convolutional activation layer in the bottom sub-network, to obtain an initial image feature of the fourth image; concatenating the initial image feature of the fourth image with the image feature of the third image; and performing convolution processing on a concatenated image feature to obtain an image feature of the fourth image.

In FIG. 5, after the image feature of the fourth image is obtained, denoising processing may be performed on the to-be-processed image based on the image feature of the fourth image to obtain a denoised image.

In this application, during extraction of an image feature of a high-resolution image based on an image feature of a low-resolution image, an image feature of a lower-resolution image may be considered at an initial stage of extracting an image feature of a higher-resolution image. In this way, a more accurate image feature is extracted for a high-resolution image.

It should be understood that, when the middle sub-networks and the bottom sub-network perform feature extraction, during concatenation or fusion of an initial image feature with a previous-layer image feature, a quantity of feature maps increases. Then, the quantity of feature maps needs to be adjusted to an original quantity.

For example, in the process shown in FIG. 5, when the bottom sub-network obtains the initial image feature of the fourth image, if the initial image feature is corresponding to four feature maps and the image feature of the third image is also corresponding to four feature maps, a quantity of corresponding feature maps becomes eight after the initial image feature of the fourth image is concatenated with the image feature of the third image and a concatenated image feature is obtained. Afterwards, when the concatenated image feature is processed to obtain the image feature of the fourth image, the quantity of feature maps needs to be adjusted, so that the image feature of the fourth image is also corresponding to four feature maps.

In this application, when denoising processing is performed on the to-be-processed image based on the image feature of the to-be-processed image, specifically, convolution processing may be first performed on the image feature of the to-be-processed image to obtain a residual estimated value of the to-be-processed image, and then the residual estimated value of the to-be-processed image may be superimposed on the to-be-processed image to obtain the denoised image.

With reference to FIG. 5, the following describes a process of obtaining the denoised image based on the residual estimated value of the to-be-processed image.

For example, as shown in FIG. 5, the bottom sub-network includes four convolutional activation layers and one convolutional layer (FIG. 5 shows a convolutional layer whose channel quantity is 1). A specific process of obtaining the denoised image by the bottom sub-network is as follows:

(1) performing processing on the fourth image by using a first convolutional activation layer, to obtain the initial image feature of the fourth image;

(2) fusing the initial image feature of the fourth image with the image feature of the third image to obtain a fused image feature;

(3) performing processing on the fused image feature by using a second convolutional activation layer to a fourth convolutional activation layer, to obtain the image feature of the fourth image;

(4) performing convolution processing on the image feature of the fourth image by using a convolutional layer, to obtain a residual estimated value of the fourth image; and (5) superimposing the residual estimated value of the fourth image on the fourth image to obtain the denoised image.

In the foregoing process, the fourth image is the to-be-processed image described above; the image feature of the to-be-processed image can be obtained according to the procedures (1) to (3); the residual estimated value of the to-be-processed image can be obtained according to the procedure (4); and the denoised image can be obtained according to the procedure (5).

Optionally, the residual networks in the top sub-network and the middle sub-networks in FIG. 5 may be residual networks in which g (where g may be an integer greater than or equal to 1) convolutional layers are skipped, while no residual network is used in the bottom sub-network.

The residual networks that skip a connection are used in the top sub-network and the middle sub-networks, so that denoising can be better implemented in a convolution processing process (which means that denoising is performed in the convolution process).

Figure 6:
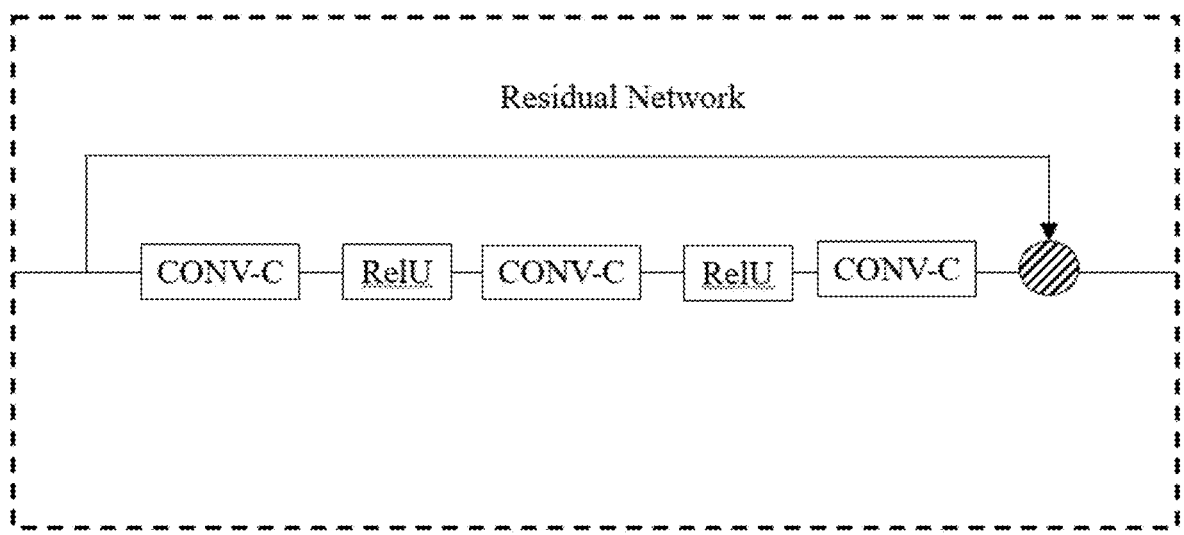
FIG. 6 is a schematic diagram of a structure of a residual network.

For example, when g is equal to 3, a structure of a residual network may be shown in FIG. 6. In FIG. 6, the residual network includes three convolutional layers (CONN-C, where CONV-C represents a convolutional layer whose channel quantity is C) and two activation function layers (ReLU). In other words, a total of three convolutional layers are skipped in the residual network.

The following describes a main workflow of the residual network in FIG. 6.

As shown in FIG. 6, assuming that an input image feature is a first intermediate image feature (the first intermediate image feature may be an image feature that is obtained after the top sub-network or the middle sub-networks in FIG. 5 perform convolution processing on the fused image feature), there are two procedures for processing the first intermediate image feature by the residual network. In one procedure is: The first intermediate image feature directly skips the three convolutional layers and the two activation function layers in FIG. 6 (which means that the first intermediate image feature is not processed), and then what is obtained is still the first intermediate image feature. In the other procedure: The first intermediate image feature is input to the three convolutional layers and the two activation function layers in FIG. 6 for processing, to obtain a residual estimated value of a first intermediate image.

Finally, the first intermediate image feature and the residual estimated value of the first intermediate image that are obtained by using the two processing procedures are superimposed, to obtain a second intermediate image feature. Further, convolution processing may continue to be performed on the second intermediate image feature in the top sub-network or the middle sub-networks in FIG. 5, to obtain an image feature of an image corresponding to a corresponding sub-network.

The foregoing details the image denoising method in this embodiment of this application with reference to FIG. 4 to FIG. 6. The following describes an image denoising apparatus in the embodiments of this application with reference to FIG. 7. It should be understood that the steps of the method shown in FIG. 4 may be performed by the image denoising apparatus shown in FIG. 7, and the foregoing related descriptions and limitations of the image denoising method are also applicable to the image denoising apparatus shown in FIG. 7. Repeated descriptions are omitted properly when the image denoising apparatus shown in FIG. 7 is described below.

Figure 7:
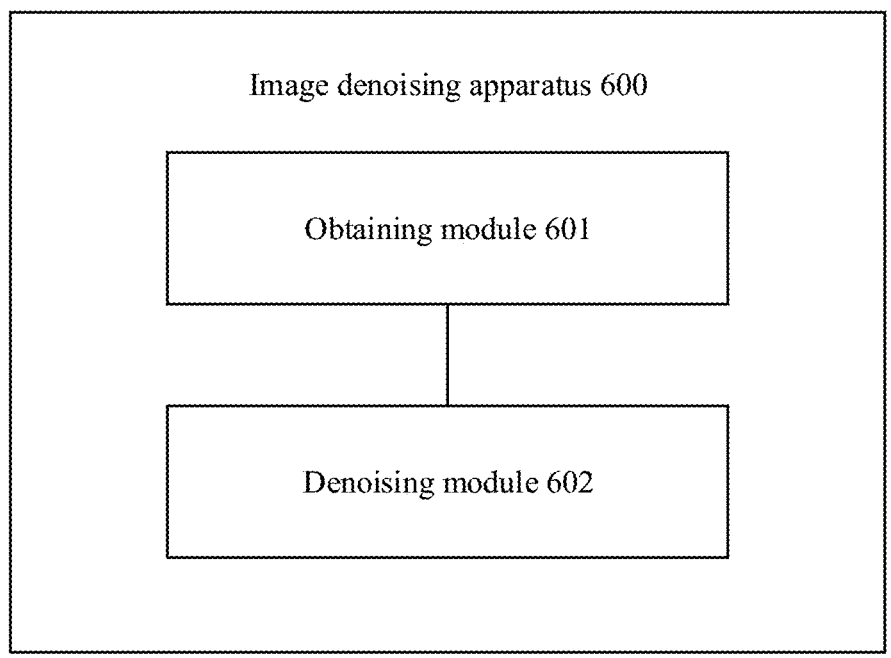
FIG. 7 is a schematic block diagram of an image denoising apparatus according to an embodiment of this application.

FIG. 7 is a schematic block diagram of an image denoising apparatus according to an embodiment of this application. The image denoising apparatus 600 shown in FIG. 7 includes:

an obtaining module 601, configured to obtain K images based on a to-be-processed image, where the K images are images obtained by reducing a resolution of the to-be-processed image, K is a positive integer, the K images include a first image to a $K^{th}$ image, and the to-be-processed image is a $(K+1)^{th}$ image;

the obtaining module 601 is further configured to obtain an image feature of the to-be-processed image based on the K images, where an image feature of an $(i+1)^{th}$ image is extracted based on an image feature of an $i^{th}$ image, a resolution of the $(i+1)^{th}$ image is higher than that of the $i^{th}$ image, the first image to the $(K+1)^{th}$ image include the $i^{th}$ image and the $(i+1)^{th}$ image, and i is a positive integer less than or equal to K; and a denoising module 602, configured to perform denoising processing on the to-be-processed image based on the image feature of the to-be-processed image to obtain a denoised image.

In this application, an image feature of a low-resolution image is used to provide guidance on extraction of an image feature of a high-resolution image, and therefore global information of the to-be-processed image can be sensed as much as possible in a process of extracting the image feature of the high-resolution image. In this way, the extracted image feature of the high-resolution image is more accurate, so that a better denoising effect is achieved during image denoising performed based on the image feature of the to-be-processed image.

It should be understood that the obtaining module 601 and the denoising module 602 in the image denoising apparatus 600 are modules obtained through division based on logical functions. Actually, the image denoising apparatus 600 may alternatively be divided into other functional modules based on a specific processing process of performing image denoising by the image denoising apparatus 600.

Figure 8:
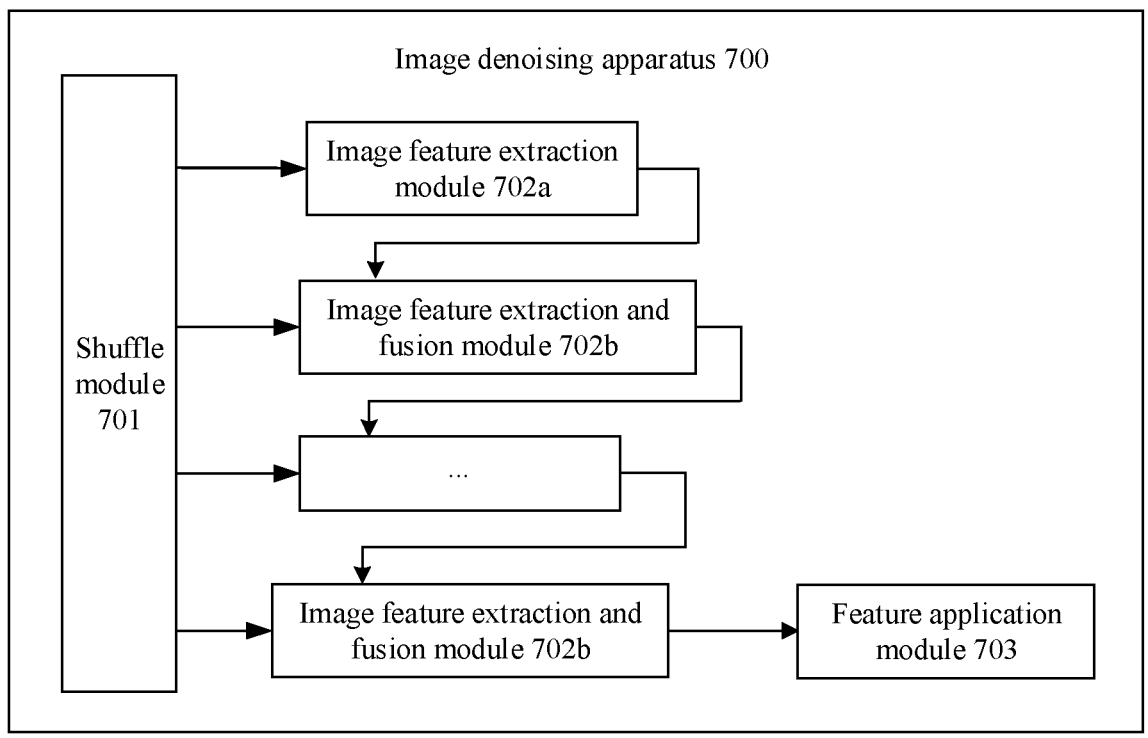
FIG. 8 is a schematic block diagram of an image denoising apparatus according to an embodiment of this application.

FIG. 8 is a schematic block diagram of an image denoising apparatus according to an embodiment of this application. As shown in FIG. 8, the image denoising apparatus 700 includes a shuffle module 701 (which is configured to perform shuffle operations to obtain images with different resolutions), an image feature extraction module 702a, several image feature extraction and fusion modules 702b, and a feature application module 703.

The shuffle module 701, the image feature extraction module 702a, and the several image feature extraction and fusion modules 702b in the image denoising apparatus 700 are equivalent to the obtaining module 601 in the image denoising apparatus 600, and the feature application module 703 is equivalent to the denoising module 602 in the image denoising apparatus 600.

It should be understood that the image denoising apparatus 700 obtains images with different resolutions by performing shuffle operations, and therefore the image denoising apparatus 700 includes the shuffle module 701. However, if the image denoising apparatus 700 obtains images with different resolutions by performing downsampling operations, the image denoising apparatus 700 may include a downsampling module 701.

In FIG. 8, the image denoising apparatus 700 performs shuffle operations on an input image to obtain the images with different resolutions, extracts an image feature of a low-resolution image, and transfers the extracted image feature of the low-resolution image layer by layer, so as to provide guidance on extraction of a feature of a high-resolution image. Herein, an input-image bootstrapping method is used, to fully utilize a large amount of context information to implement efficient multilayer image information concatenation. This can achieve a better denoising effect. The following describes functions of the modules in the image denoising apparatus in FIG. 8 in the whole denoising process.

The shuffle module performs shuffle (shuffle) operations to reconstruct a structure of the input image, so as to obtain several images with different resolution tensors (tensor) and different channel tensors. For example, an input image with a size of M×N and a channel quantity of C (dimensions are denoted as M×N×C) may be transformed into an image with a size of M/2×N/2 and a channel quantity of 4 C (dimensions are denoted as M/2×N/2×4C). It should be understood that, herein, when the shuffle operations are performed on the input image, the resolution of the image is reduced, but the channel quantity of the image is increased, so that all information about the input image is still retained in a low-resolution image obtained after the resolution is reduced.

Feature extraction module: For a lowest-resolution image, an image feature of the image needs to be extracted only, and feature fusion does not need to be performed. Therefore, the feature extraction module may be configured to extract the image feature of the lowest-resolution image.

Several feature extraction and fusion modules: Except for the lowest-resolution image, during obtaining of an image feature corresponding to a resolution, both feature extraction and feature fusion need to be performed.

Specifically, the feature extraction and fusion module is configured to concatenate, by using a concatenation (concatenate) operation, an image feature extracted in a previous-layer network that processes a lower-resolution image with an initial feature extracted by a current-layer network for a higher-resolution image, to finally obtain an image feature of the current-layer image.

The feature application module applies the finally obtained feature to the input image, to obtain a final output. The finally obtained output image is an image obtained after denoising processing is performed on the input image.

Figure 9:
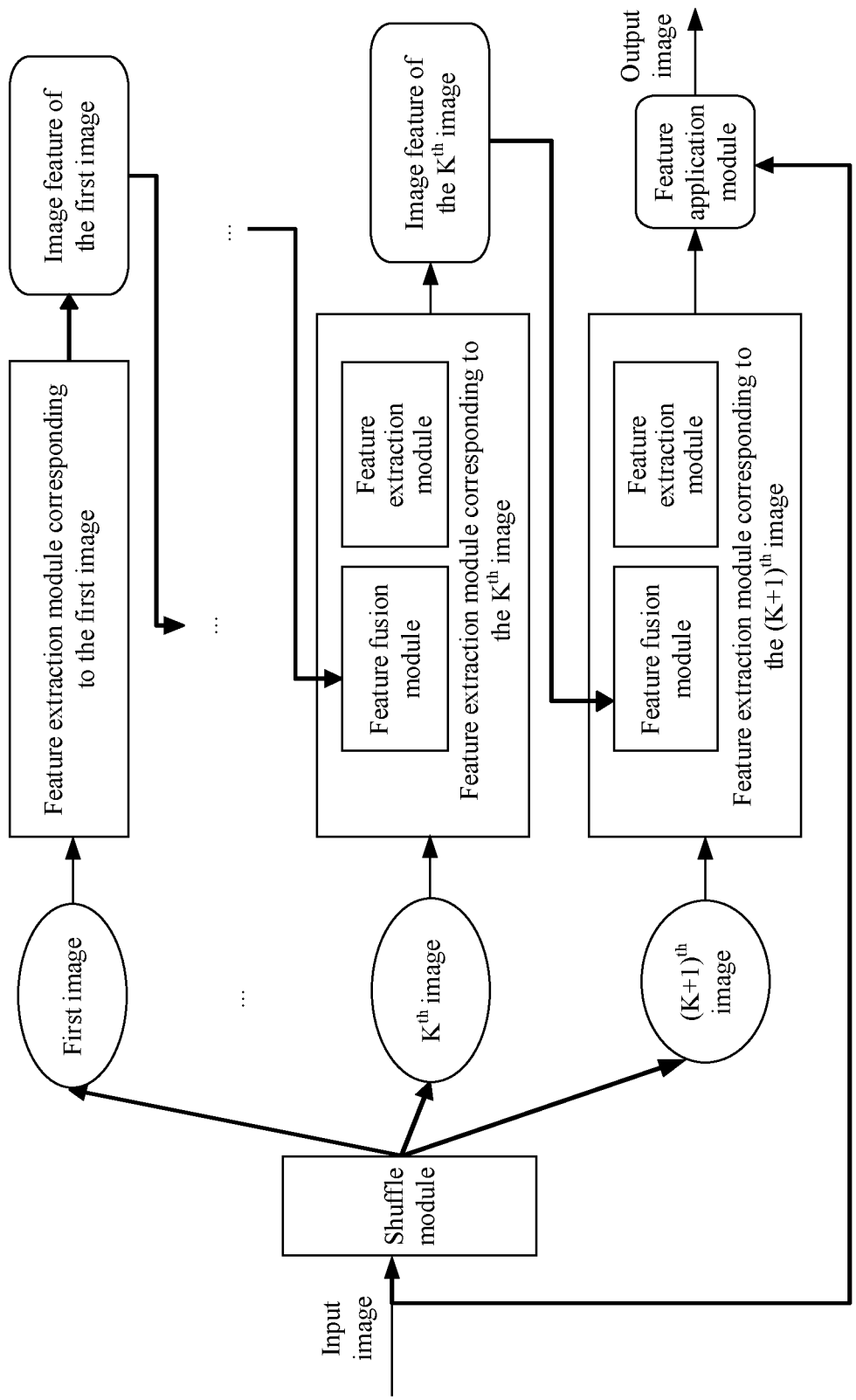
FIG. 9 is a schematic diagram of a process of performing image denoising by an image denoising apparatus according to an embodiment of this application.

For a better understanding of the process of performing image denoising by the image denoising apparatus 700 in FIG. 8, the following provides a description with reference to FIG. 9.

FIG. 9 is a schematic diagram of a process of performing image denoising by an image denoising apparatus according to an embodiment of this application.

In FIG. 9, the shuffle module performs the shuffle operations on the input image, to obtain a first image to a $(K+1)^{th}$ image. A resolution of the first image is the lowest, a resolution of the $(K+1)^{th}$ image is the highest, and the $(K+1)^{th}$ image is the input image.

After the images with different resolutions are obtained, a module corresponding to each image may be used to process the image, to obtain an image feature of the image.

Specifically, a feature extraction module corresponding to the first image is configured to extract an image feature of the first image, a feature extraction and fusion module corresponding to a second image is configured to extract an image feature of the second image based on the image feature of the first image, . . . , a feature extraction and fusion module corresponding to a $K^{th}$ image is configured to extract an image feature of the $K^{th}$ image based on the image feature of the $(K-1)^{th}$ image, and a feature extraction and fusion module corresponding to a $(K+1)^{th}$ image is configured to extract an image feature of the (K+1)$^{th}$ image based on the image feature of the K$^{th}$ image.

After the image feature of the (K+1)$^{th}$ image is obtained, the feature application module may be configured to: obtain a residual estimated value of the (K+1)$^{th}$ image, and superimpose the residual estimated value on the input image to obtain an output image. The output image is a denoised image.

Figure 10:
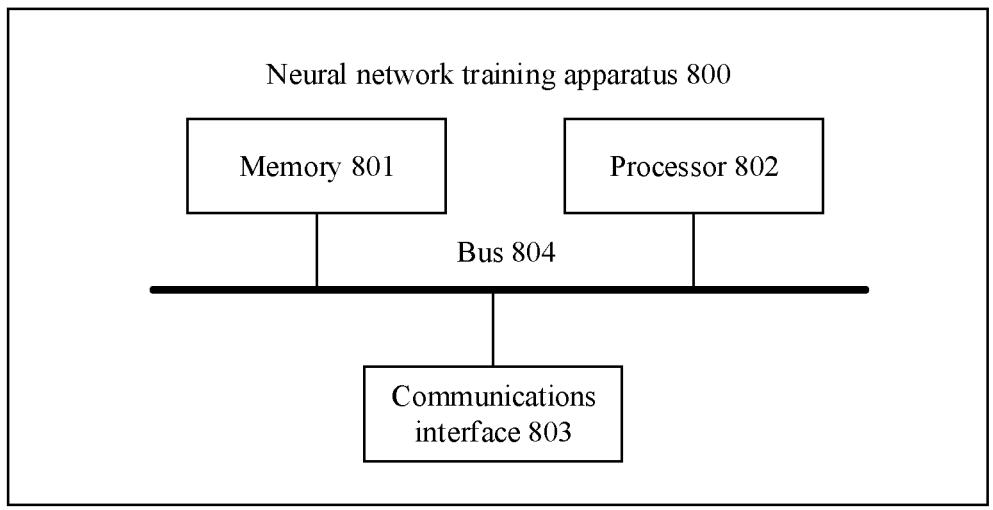
FIG. 10 is a schematic diagram of a hardware structure of a neural network training apparatus according to an embodiment of this application.

FIG. 10 is a schematic diagram of a hardware structure of a neural network training apparatus according to an embodiment of this application. The neural network training apparatus 800 (the apparatus 800 may specifically be a computer device) shown in FIG. 10 includes a memory 801, a processor 802, a communications bus 803, and a bus 804. The memory 801, the processor 802, and the communications interface 803 implement mutual communication connections through the bus 804.

The memory 801 may be a read only memory (read only memory, ROM), a static storage device, a dynamic storage device, or a random access memory (random access memory, RAM). The memory 801 may store a program, and when the program stored in the memory 801 is being executed by the processor 802, the processor 802 and the communications interface 803 are configured to perform the steps in a neural network training method in the embodiments of this application.

The processor 802 may be configured to execute a related program by using a general-purpose central processing unit (central processing unit, CPU), a microprocessor, an application-specific integrated circuit (ASIC), a graphics processing unit (graphics processing unit, GPU), or one or more integrated circuits, to implement functions that need to be performed by units in the neural network training apparatus in this embodiment of this application, or to perform the neural network training method in the method embodiment of this application.

The processor 802 may be an integrated circuit chip and has a signal processing capability. In an implementation process, the steps of the neural network training method in this application may be completed by using an integrated logic circuit of hardware in the processor 802 or an instruction in a software form. The foregoing processor 802 may be a general purpose processor, a digital signal processor (digital signal processing, DSP), an application-specific integrated circuit (ASIC), a field programmable gate array (field programmable gate array, FPGA) or another programmable logical device, a discrete gate or transistor logic device, or a discrete hardware component. It may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 801. The processor 802 reads information from the memory 801, and in combination with the hardware of the processor 802, implements the functions that need to be performed by the units included in the neural network training apparatus in this embodiment of this application, or performs the neural network training method in the method embodiment of this application.

The communications interface 803 implements communication between the apparatus 800 and another device or a communications network by using a transceiver apparatus, for example, but not limited to, a transceiver. For example, the communications interface 803 may obtain training data (for example, an original image and a noise image that is obtained after noise is added to the original image in the embodiments of this application).

The bus 804 may include a path for transmitting information between the components (for example, the memory 801, the processor 802, and the communications interface 803) of the apparatus 800.

Figure 11:
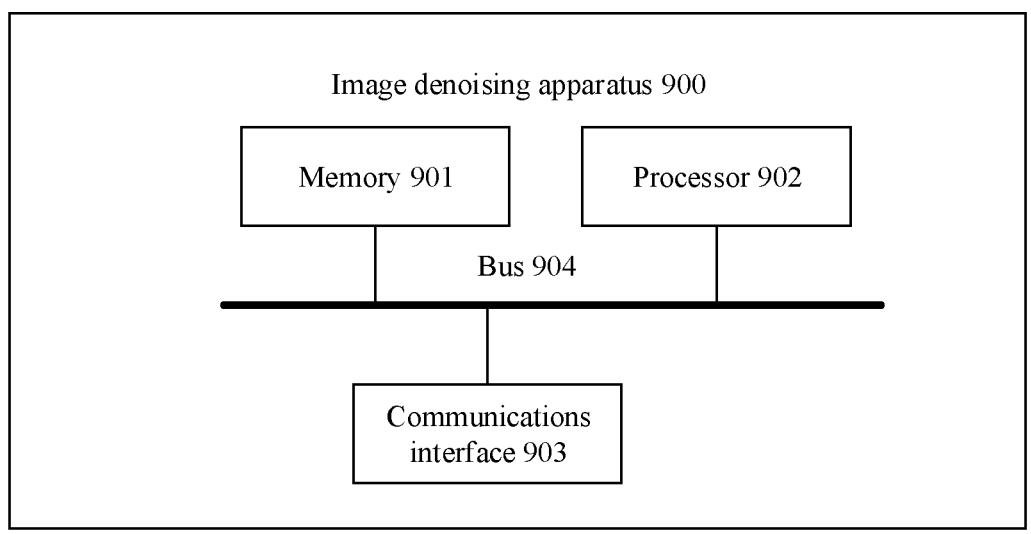
FIG. 11 is a schematic diagram of a hardware structure of an image denoising apparatus according to an embodiment of this application.

FIG. 11 is a schematic diagram of a hardware structure of an image denoising apparatus according to an embodiment of this application. The image denoising apparatus 900 (the apparatus 900 may specifically be a computer device) shown in FIG. 11 includes a memory 901, a processor 902, a communications bus 903, and a bus 904. The memory 901, the processor 902, and the communications interface 903 implement mutual communication connections through the bus 904.

The memory 901 may be a ROM, a static storage device, and a RAM. The memory 901 may store a program, and when the program stored in the memory 901 is being executed by the processor 902, the processor 902 and the communications interface 903 are configured to perform the steps in the image denoising method in this embodiment of this application.

The processor 902 may be configured to execute a related program by using a general-purpose CPU, a microprocessor, an ASIC, a GPU, or one or more integrated circuits, to implement functions that need to be performed by units in the image denoising apparatus in this embodiment of this application, or to perform the image denoising method in the method embodiment of this application.

The processor 902 may alternatively be an integrated circuit chip and has a signal processing capability. In an implementation process, the steps of the image denoising method in this application may be completed by using an integrated logic circuit of hardware in the processor 902 or an instruction in a software form. The foregoing processor 902 may alternatively be a general purpose processor, a DSP, an ASIC, an FPGA or another programmable logical device, a discrete gate or transistor logic device, or a discrete hardware component. It may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 901. The processor 902 reads information from the memory 901, and in combination with the hardware of the processor 902, implements the functions that need to be performed by the units included in the image denoising apparatus in this embodiment of this application, or performs the image denoising method in the method embodiment of this application.

The communications interface 903 implements communication between the apparatus 900 and another device or a communications network by using a transceiver apparatus, for example, but not limited to, a transceiver. For example, the communications interface 903 may obtain training data.

The bus 904 may include a path for transmitting information between the components (for example, the memory 901, the processor 902, and the communications interface 903) of the apparatus 900.

It should be understood that the obtaining module 601 and the denoising module 602 in the image denoising apparatus 600 are equivalent to the processor 902.

It should be noted that although the apparatuses 800 and 900 shown in FIG. 10 and FIG. 11 merely show the memory, the processor, and the communications interface, in a specific implementation process, a person skilled in the art should understand that the apparatuses 800 and 900 further include other components necessary to implement normal running. In addition, according to a specific requirement, a person skilled in the art should understand that the apparatus 800 and 900 may further include hardware components for implementing other additional functions. In addition, a person skilled in the art should understand that the apparatuses 800 and 900 may alternatively include components necessary to implement the embodiments of this application, but unnecessarily include all the components shown in FIG. 10 or FIG. 11.

It can be understood that the apparatus 800 is equivalent to the training device 120 in FIG. 1, and the apparatus 900 is equivalent to the execution device 110 in FIG. 1.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An image denoising method, comprising:
   obtaining K images based on a to-be-processed image, wherein the K images are images obtained by reducing a resolution of the to-be-processed image, K is a positive integer, the K images comprise a first image to a $K^{th}$ image, and the to-be-processed image is a $(K+1)^{th}$ image;
   obtaining an image feature of the to-be-processed image based on the K images, wherein an image feature of an $(i+1)^{th}$ image is extracted based on an image feature of an $i^{th}$ image, a resolution of the $(i+1)^{th}$ image is higher than that of the $i^{th}$ image, the first image to the $(K+1)^{th}$ image comprise the $i^{th}$ image and the $(i+1)^{th}$ image, and i is a positive integer less than or equal to K; and
   performing denoising processing on the to-be-processed image based on the image feature of the to-be-processed image to obtain a denoised image, the denoising processing comprising:
      performing convolution processing on the image feature of the to-be-processed image to obtain a residual estimated value of the to-be-processed image; and
      superimposing the residual estimated value of the to-be-processed image on the to-be-processed image to obtain the denoised image.

2. The method according to claim 1, wherein that an image feature of an $(i+1)^{th}$ image is extracted based on an image feature of an $i^{th}$ image comprises:
   performing convolution processing on the $(i+1)^{th}$ image by using a first convolutional layer to an $n^{th}$ convolutional layer in N convolutional layers, to obtain an initial image feature of the $(i+1)^{th}$ image, wherein both n and N are positive integers, n is less than or equal to N, and N is a total quantity of convolutional layers used when the image feature of the $(i+1)^{th}$ image is extracted;

fusing the initial image feature of the $(i+1)^{th}$ image with the image feature of the $i^{th}$ image to obtain a fused image feature; and performing convolution processing on the fused image feature by using an $(n+1)^{th}$ convolutional layer to an $N^{th}$ convolutional layer in the N convolutional layers, to obtain the image feature of the $(i+1)^{th}$ image.

3. The method according to claim 1, wherein the obtaining K images based on a to-be-processed image comprises:

performing shuffle operations on the to-be-processed image for K times, to obtain the first image to the $K^{th}$ image whose resolutions and channel quantities are different from those of the to-be-processed image, wherein the resolution of the $i^{th}$ image is lower than that of the to-be-processed image, and a channel quantity of the $i^{th}$ image is determined based on the channel quantity of the to-be-processed image and a ratio of the resolution of the $i^{th}$ image to the resolution of the to-be-processed image.

4. The method according to claim 3, wherein a ratio of the channel quantity of the $i^{th}$ image to the channel quantity of the to-be-processed image is less than or equal to the ratio of the resolution of the $i^{th}$ image to the resolution of the to-be-processed image.

5. An image denoising apparatus, comprising a processor and a receiving interface, the processor is configured to execute one or more instructions to cause the apparatus to:

obtain K images based on a to-be-processed image, wherein the K images are images obtained by reducing a resolution of the to-be-processed image, K is a positive integer, the K images comprise a first image to a $K^{th}$ image, and the to-be-processed image is a $(K+1)^{th}$ image;

obtain an image feature of the to-be-processed image based on the K images, wherein an image feature of an $(i+1)^{th}$ image is extracted based on an image feature of an $i^{th}$ image, a resolution of the $(i+1)^{th}$ image is higher than that of the $i^{th}$ image, the first image to the $(K+1)^{th}$ image comprise the $i^{th}$ image and the $(i+1)^{th}$ image, and i is a positive integer less than or equal to K; and perform denoising processing on the to-be-processed image based on the image feature of the to-be-processed image to obtain a denoised image, the denoising processing comprising:

performing convolution processing on the image feature of the to-be-processed image to obtain a residual estimated value of the to-be-processed image; and superimposing the residual estimated value of the to-be-processed image on the to-be-processed image to obtain the denoised image.

6. The apparatus according to claim 5, wherein the processing unit is further configured to:

perform convolution processing on the $(i+1)^{th}$ image by using a first convolutional layer to an $n^{th}$ convolutional layer in N convolutional layers, to obtain an initial image feature of the $(i+1)^{th}$ image, wherein both n and N are positive integers, n is less than or equal to N, and N is a total quantity of convolutional layers used when the image feature of the $(i+1)^{th}$ image is extracted;

fuse the initial image feature of the $(i+1)^{th}$ image with the image feature of the $i^{th}$ image to obtain a fused image feature; and perform convolution processing on the fused image feature by using an $(n+1)^{th}$ convolutional layer to an $N^{th}$ convolutional layer in the N convolutional layers, to obtain the image feature of the $(i+1)^{th}$ image.

7. The apparatus according to claim 5, wherein the processing unit is further configured to:

perform shuffle operations on the to-be-processed image for K times, to obtain the first image to the $K^{th}$ image whose resolutions and channel quantities are different from those of the to-be-processed image, wherein the resolution of the $i^{th}$ image is lower than that of the to-be-processed image, and a channel quantity of the $i^{th}$ image is determined based on the channel quantity of the to-be-processed image and a ratio of the resolution of the $i^{th}$ image to the resolution of the to-be-processed image.

8. The apparatus according to claim 7, wherein a ratio of the channel quantity of the $i^{th}$ image to the channel quantity of the to-be-processed image is less than or equal to the ratio of the resolution of the $i^{th}$ image to the resolution of the to-be-processed image.

9. A non-transitory computer-readable storage medium, wherein the computer storage medium stores a computer program, the computer program comprises a program instruction, and when the program instruction is executed by a processor, the processor is enabled to perform the method comprising:

obtaining K images based on a to-be-processed image, wherein the K images are images obtained by reducing a resolution of the to-be-processed image, K is a positive integer, the K images comprise a first image to a $K^{th}$ image, and the to-be-processed image is a $(K+1)^{th}$ image;

obtaining an image feature of the to-be-processed image based on the K images, wherein an image feature of an $(i+1)^{th}$ image is extracted based on an image feature of an $i^{th}$ image, a resolution of the $(i+1)^{th}$ image is higher than that of the $i^{th}$ image, the first image to the $(K+1)^{th}$ image comprise the $i^{th}$ image and the $(i+1)^{th}$ image, and i is a positive integer less than or equal to K; and performing denoising processing on the to-be-processed image based on the image feature of the to-be-processed image to obtain a denoised image, the denoising processing comprising:

performing convolution processing on the image feature of the to-be-processed image to obtain a residual estimated value of the to-be-processed image; and superimposing the residual estimated value of the to-be-processed image on the to-be-processed image to obtain the denoised image.

10. The non-transitory computer-readable storage medium according to claim 9, wherein that an image feature of an $(i+1)^{th}$ image is extracted based on an image feature of an $i^{th}$ image comprises:

performing convolution processing on the $(i+1)^{th}$ image by using a first convolutional layer to an $n^{th}$ convolutional layer in N convolutional layers, to obtain an initial image feature of the $(i+1)^{th}$ image, wherein both n and N are positive integers, n is less than or equal to N, and N is a total quantity of convolutional layers used when the image feature of the $(i+1)^{th}$ image is extracted;

fusing the initial image feature of the $(i+1)^{th}$ image with the image feature of the $i^{th}$ image to obtain a fused image feature; and performing convolution processing on the fused image feature by using an $(n+1)^{th}$ convolutional layer to an $N^{th}$ convolutional layer in the N convolutional layers, to obtain the image feature of the $(i+1)^{th}$ image.

11. The non-transitory computer-readable storage medium according to claim 9, wherein the obtaining K images based on a to-be-processed image comprises:
- performing shuffle operations on the to-be-processed image for K times, to obtain the first image to the $K^{th}$ image whose resolutions and channel quantities are different from those of the to-be-processed image, wherein the resolution of the $i^{th}$ image is lower than that of the to-be-processed image, and a channel quantity of the $i^{th}$ image is determined based on the channel quantity of the to-be-processed image and a ratio of the resolution of the $i^{th}$ image to the resolution of the to-be-processed image.

12. The non-transitory computer-readable storage medium according to claim 11, wherein a ratio of the channel quantity of the $i^{th}$ image to the channel quantity of the to-be-processed image is less than or equal to the ratio of the resolution of the $i^{th}$ image to the resolution of the to-be-processed image.

\* \* \* \* \*